United States Patent
Tsue et al.

(10) Patent No.: US 7,746,487 B2
(45) Date of Patent: Jun. 29, 2010

(54) APPARATUS, METHOD, AND PROGRAM FOR SELECTING IMAGES IN A PHOTO ALBUM

(75) Inventors: Takashi Tsue, Kanagawa-ken (JP); Koichi Yamada, Kanagawa-ken (JP); Kazuhiro Mino, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1182 days.

(21) Appl. No.: 11/020,576

(22) Filed: Dec. 27, 2004

(65) Prior Publication Data
US 2005/0168779 A1    Aug. 4, 2005

(30) Foreign Application Priority Data

Dec. 25, 2003  (JP)  ............................. 2003-428541
Dec. 9, 2004   (JP)  ............................. 2004-356637

(51) Int. Cl.
G06F 15/00    (2006.01)
G06F 3/12     (2006.01)
G06K 1/00     (2006.01)

(52) U.S. Cl. .................................... 358/1.13; 358/1.15
(58) Field of Classification Search ................ 358/450, 358/1.15, 540, 1.13, 1.14
See application file for complete search history.

(56) References Cited

U.S. PATENT DOCUMENTS 5,956,737 A *   9/1999  King et al. .................. 715/202
6,324,545 B1 * 11/2001  Morag ......................... 707/202
6,636,648 B2 * 10/2003  Loui et al. ................... 382/284
7,518,640 B2 *  4/2009  Nakajima et al. ......... 348/231.2
2005/0044100 A1 *  2/2005  Hooper et al. .............. 707/102
2005/0111737 A1 *  5/2005  Das et al. .................... 382/190

FOREIGN PATENT DOCUMENTS

| JP | 9-21468 A     | 8/1997 |
| JP | 9-214868 A    | 8/1997 |
| JP | 2003-150969 A | 5/2003 |
| JP | 2003-182260 A | 7/2003 |

* cited by examiner

Primary Examiner—Douglas Q Tran
(74) Attorney, Agent, or Firm—Sughrue Mion, PLLC

(57) ABSTRACT

For generating a photo album of an event such as wedding, images to be inserted in image insertion areas in a template of the photo album can be selected easily. A professional photographer photographs the bride and groom of a wedding. Images are read from a developed film and stored in a file server. An editing screen is displayed including a template display field having the template therein and a catalog display field having a catalog of the images therein. When an operator selects any one of the image insertion areas in the template, a condition specification information set representing a state of the image to be inserted in the selected image insertion area is referred to, and appropriate images that agree with the condition specification information set are sifted from the catalog of the images.

20 Claims, 15 Drawing Sheets

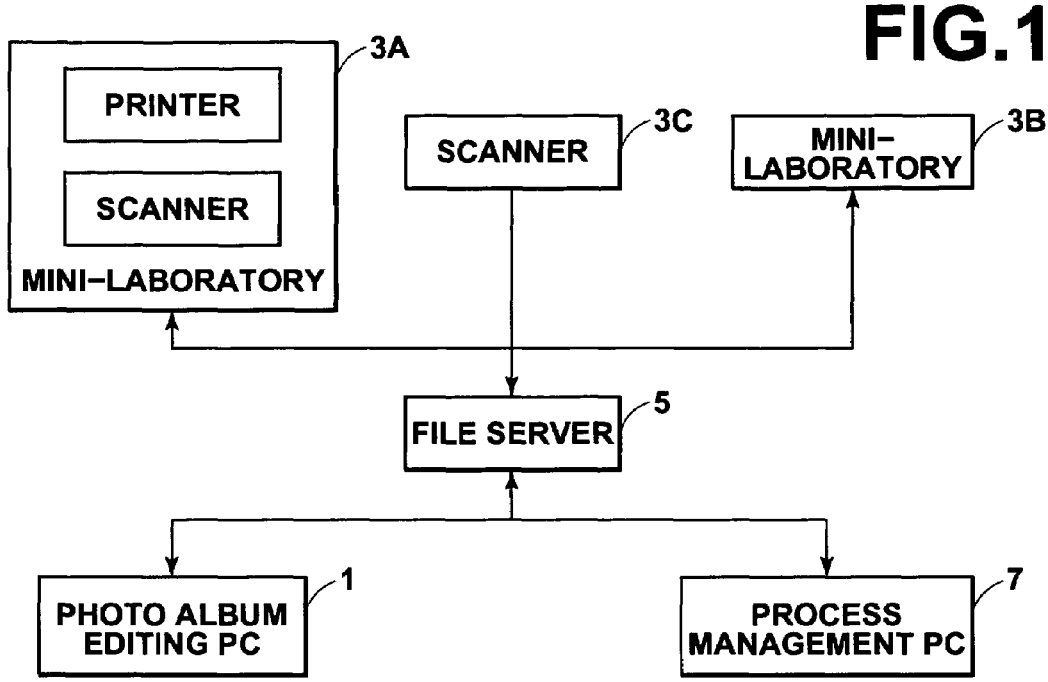
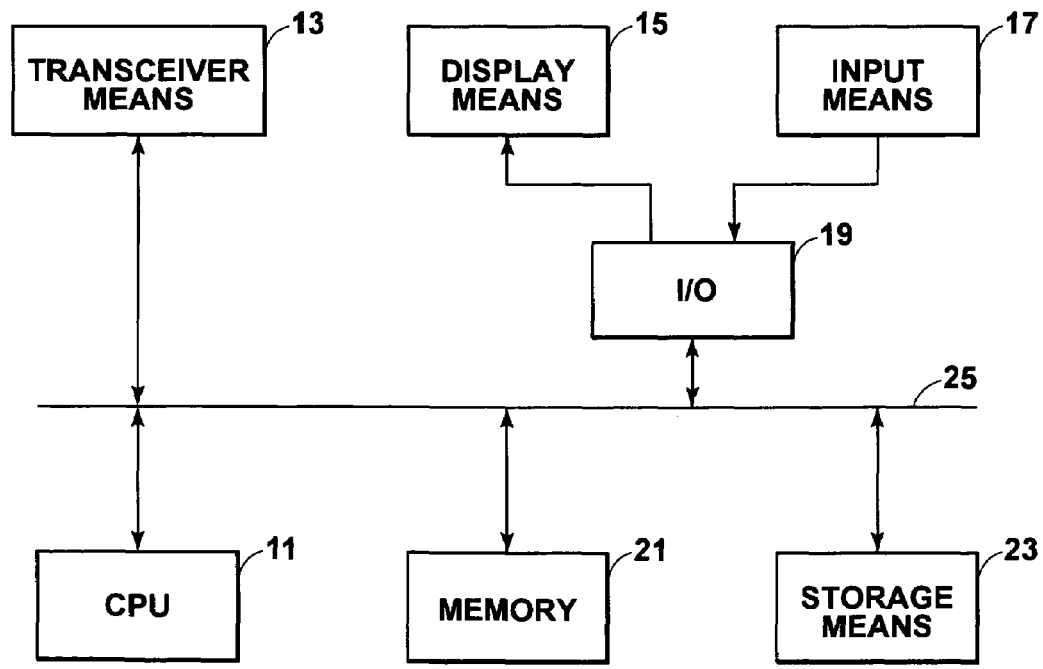

TEMPLATE T1

1-a: CONDITION SPECIFICATION INFORMATION SET 1

1-b: CONDITION SPECIFICATION INFORMATION SET 2

1-c: CONDITION SPECIFICATION INFORMATION SET 3

2-a: CONDITION SPECIFICATION INFORMATION SET 4

```
TEMPLATE T1

1-a  :DSCF0012.jpg
    1-b  :DSCF0020.jpg
    1-c  :DSCF0023.jpg
    2-a  :DSCF0030.jpg
```

FIG.9
TEMPLATE T2
1-a : CONDITION SPECIFICATION INFORMATION SET
1-1, 1-2, 1-3
1-b : CONDITION SPECIFICATION INFORMATION SET
2-1, 2-2
1-c : CONDITION SPECIFICATION INFORMATION SET
3-1, 3-2, 3-3
2-a : CONDITION SPECIFICATION INFORMATION SET
4-1, 4-2, 4-3
FIG.10A
G1
FIG.10B
G2
FIG.11
| TEMPLATE T3 | | | | | |
|---|---|---|---|---|---|
| 1-a | CONDITION SPECIFICATION INFORMATION SET | 1-1 | 1-2 | 1-3 |
| 2-a | CONDITION SPECIFICATION INFORMATION SET | 2-1 | 2-2 | 2-3 |

TEMPLATE T5

1-a : CONDITION SPECIFICATION
INFORMATION SET 1-1, 1-2

2-a : CONDITION SPECIFICATION
INFORMATION SET 2-1, 2-2, 2-3, 2-4

2-b : CONDITION SPECIFICATION
INFORMATION SET 3-1, 3-2, 3-3, 3-4, 3-5, 3-6

FIG.16

| No. | NAMES | CONDITION SPECIFICATION INFORMATION SET FOR 1-a | CONDITION SPECIFICATION INFORMATION SET FOR 2-a | CONDITION SPECIFICATION INFORMATION SET FOR 2-b |
|---|---|---|---|---|
| 1 | CHAPEL WEDDING 1 (RING EXCHANGE 1) | CONDITION SPECIFICATION INFORMATION SET 1-1 | CONDITION SPECIFICATION INFORMATION SET 2-1 | CONDITION SPECIFICATION INFORMATION SET 3-1 |
| 2 | CHAPEL WEDDING 2 (RING EXCHANGE 2) | 〃 | 〃 | CONDITION SPECIFICATION INFORMATION SET 3-2 |
| 3 | CHAPEL WEDDING 3 (SIGNING OATH 1) | 〃 | CONDITION SPECIFICATION INFORMATION SET 2-2 | CONDITION SPECIFICATION INFORMATION SET 3-3 |
| 4 | CHAPEL WEDDING 4 (SIGNING OATH 2) | 〃 | 〃 | CONDITION SPECIFICATION INFORMATION SET 3-4 |
| 5 | RECEPTION SCENE 1 (CUTTING WEDDING CAKE) | CONDITION SPECIFICATION INFORMATION SET 1-2 | CONDITION SPECIFICATION INFORMATION SET 2-3 | CONDITION SPECIFICATION INFORMATION SET 3-5 |
| 6 | RECEPTION SCENE 2 (CANDLE LIGHTING SERVICE) | 〃 | CONDITION SPECIFICATION INFORMATION SET 2-4 | CONDITION SPECIFICATION INFORMATION SET 3-6 |

FIG.17

CONDITION SPECIFICATION INFORMATION SETS FOR IMAGE INSERTION AREA 1-a

| CONDITION SPECIFICATION INFORMATION SET 1-1 | INCLUDING 3 PEOPLE<br>PERSON IN THE LEFT FACING TO THE RIGHT<br>PERSON IN THE RIGHT FACING TO THE LEFT<br>PERSON IN THE MIDDLE NOT FACING SIDEWAYS<br>INCLUDING CROSS |
|---|---|
| CONDITION SPECIFICATION INFORMATION SET 1-2 | INCLUDING 2 PEOPLE<br>PERSON IN THE RIGHT DRESSED IN WHITE<br>PERSON IN THE LEFT NOT DRESSED IN WHITE<br>PERSON IN THE RIGHT HOLDING RED FLOWERS<br>NOT INCLUDING CROSS |

FIG.18

CONDITION SPECIFICATION INFORMATION SETS FOR IMAGE INSERTION AREA 2-a

| CONDITION SPECIFICATION INFORMATION SET 2-1 | INCLUDING 2 PEOPLE<br>PERSON IN THE LEFT NOT LOOKING SIDEWAYS<br>PERSON IN THE RIGHT FACING TO THE LEFT<br>PERSON IN THE RIGHT DRESSED IN WHITE<br>INCLUDING RING |
|---|---|
| CONDITION SPECIFICATION INFORMATION SET 2-2 | INCLUDING 2 PEOPLE<br>PEOPLE FACING TO THE LEFT<br>PERSON IN THE RIGHT DRESSED IN WHITE<br>INCLUDING WHITE AREA OF PARALLELOGRAM |
| CONDITION SPECIFICATION INFORMATION SET 2-3 | INCLUDING 2 PEOPLE<br>PEOPLE FACING TO THE LEFT<br>PERSON IN THE RIGHT DRESSED IN WHITE<br>INCLUDING WHITE CAKE |
| CONDITION SPECIFICATION INFORMATION SET 2-4 | INCLUDING 2 OR MORE PEOPLE<br>PERSON ON FAR RIGHT FACING TO THE LEFT<br>PERSON ON FAR RIGHT DRESSED IN WHITE<br>INCLUDING CANDLE |

FIG.19

CONDITION SPECIFICATION INFORMATION SETS FOR IMAGE INSERTION AREA 2-b

| CONDITION SPECIFICATION INFORMATION SET 3-1 | INCLUDING HANDS<br>INCLUDING RING |
|---|---|
| CONDITION SPECIFICATION INFORMATION SET 3-2 | INCLUDING 2 RINGS<br>INCLUDING NO PEOPLE<br>INCLUDING RECTANGULAR AREA AT THE CENTER |
| CONDITION SPECIFICATION INFORMATION SET 3-3 | INCLUDING HANDS<br>INCLUDING WHITE AREA OF PARALLELOGRAM |
| CONDITION SPECIFICATION INFORMATION SET 3-4 | INCLUDING WHITE AREA<br>INCLUDING NO PEOPLE<br>INCLUDING RED FLOWER AT THE CENTER |
| CONDITION SPECIFICATION INFORMATION SET 3-5 | INCLUDING WHITE CAKE<br>INCLUDING WHITE AREA OF PARALLELOGRAM |
| CONDITION SPECIFICATION INFORMATION SET 3-6 | INCLUDING WHITE CANDLE<br>INCLUDING FLOWER |

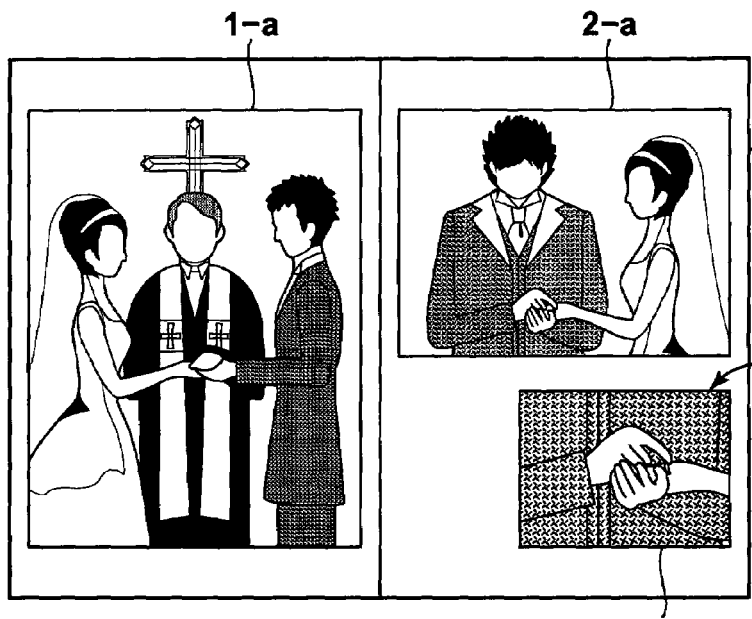
FIG.21A   FIG.21B
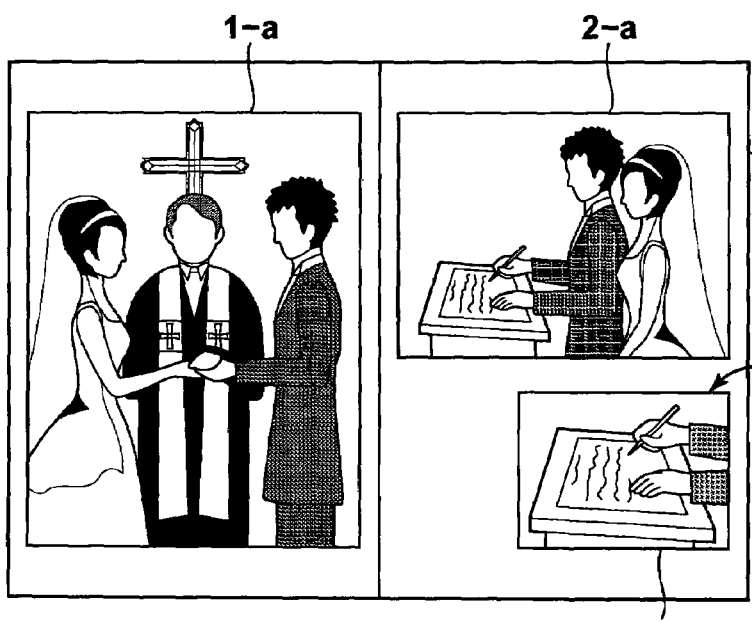
FIG.22A   FIG.22B

APPARATUS, METHOD, AND PROGRAM FOR SELECTING IMAGES IN A PHOTO ALBUM

BACKGROUND OF THE INVENTION

1. Field of the Invention

The present invention relates to an image editing apparatus and an image editing method for selecting an image to be inserted in an image insertion area in a template. The present invention also relates to a program for causing a computer to execute the image editing method.

2. Description of the Related Art

As has been described in Japanese Unexamined Patent Publication No. 9(1997)-214868, a method has been proposed for generating a photo album, by reading images from a film with a film scanner, and by printing an image including a selected part of the images arranged in desired layout.

In addition, another method has also been proposed in Japanese Unexamined Patent Publication No. 2003-182260 for generating a photo album, by printing desired images as photographs, and by inserting the photographs in photo mounting corners formed on photo album paper according to a size of the photographs and layout of the photo album.

Meanwhile, in order to generate a photo album of a wedding, a professional photographer sometimes photographs the bride and groom as well as attendants in front of a church as a venue for the wedding, or in front of a monument during the wedding. Images obtained in this manner are used for generating a photo album, and the photo album tells a story that can be enjoyed later, since the album traces the behavior of the bride and groom on their wedding day.

In order to generate a photo album, a professional photographer or an operator at a DPE store that provides a photo album generation service (hereinafter collectively referred to as an operator) stores images obtained by photography in an image server, and displays on display means such as a monitor of a workstation a catalog of the images stored in the image server and a template having an image insertion area used for photo album generation. The operator then selects one of the images to be inserted in the image insertion area from the catalog. At this time, the operator carries out image editing processing, such as processing for changing image quality (blurring or sharpness enhancement, for example), processing for image reshaping (such as rotation, resizing, and trimming), and processing for image restoration (such as red-eye correction and scar removal) on the selected image so that the image inserted in the image insertion area becomes attractive.

A photo album is generated by printing images edited in the above manner and pasting the images on photo album paper. A photo album can also be generated by printing composite images having a layout of the photo album generated from edited images inserted in image insertion areas of a template, as has been described in Japanese Unexamined Patent Publication No. 9(1997)-214868.

In the case where a photo album is generated in the above manner, hundreds of images are obtained by photography on an event such as a wedding. However, an operator is heavily burdened with selection of an image to be inserted in an image insertion area in a template from a catalog including the hundreds of images. Especially, photography is carried out for obtaining a plurality of images of the same scene, since some of the images may become unnecessary due to people with closed eyes or facing sideways therein, for example. Consequently, the burden on the operator is uselessly increased by inclusion of such unnecessary images in the catalog at the time of selection of the image to be included in the photo album.

SUMMARY OF THE INVENTION

The present invention has been conceived based on consideration of the above circumstances. An object of the present invention is therefore to enable easy selection of an image to be inserted in an image insertion area in a template for generation of a photo album especially on an event such as wedding.

A first image editing apparatus of the present invention comprises:

display means for carrying out various kinds of display;

image display control means for displaying a catalog of images on the display means;

template display control means for displaying on the display means a template having at least one image insertion area and added with condition specification information that specifies a state of an image or respective images to be inserted in the image insertion area or areas, together with the catalog;

selection reception means for receiving selection of the image insertion area or any one of the image insertion areas in the template displayed on the display means;

image sifting means for sifting appropriate images that agree with the condition specification information for the selected image insertion area from the catalog, with reference to the condition specification information for the selected image insertion area; and image selection means for receiving selection of the image to be inserted in the selected image insertion area from the appropriate images. The template is used as photo album paper.

The condition specification information comprises conditions for determining a state of a subject in an image or images that are appropriate for insertion in the image insertion area or areas and an image quality thereof. More specifically, in the case of people as the subject, the condition specification information includes conditions for eliminating unnecessary images such as an image of people having closed eyes or red eyes, an image of people facing sideways, and an image not having a predetermined number of people. Furthermore, the condition specification information may comprise conditions for inclusion of necessary images, such as an image with a subject of a specific type (a church or the ocean, for example), an image of two people, an image of a person holding red flowers, and an image satisfying a criterion regarding graininess of skin color or regarding color information (brightness, lightness, and saturation of the subject, for example). The condition specification information may also include conditions for specifying a state of only a part of an image. In this case, the appropriate images are sifted as long as a part, such as a center part of each of the appropriate images, satisfies the conditions.

A second image editing apparatus of the present invention comprises:

display means for carrying out various kinds of display;

image display control means for displaying a catalog of images on the display means;

template display control means for displaying on the display means a template having at least one image insertion area and added with a plurality of sets of condition specification information that specify a condition of an image or each of images to be inserted in the image insertion area or areas, together with the catalog;

selection reception means for receiving selection of the image insertion area or any one of the image insertion areas in the template displayed on the display means;

image sifting means for sifting appropriate images that agree with at least one of the sets of condition specification information for the selected image insertion area from the catalog, with reference to the set or sets of condition specification information among the sets of condition specification information for the selected image insertion area; and image selection means for receiving selection of the image to be inserted in the selected image insertion area from the appropriate images. The template is used as photo album paper.

A third image editing apparatus of the present invention comprises:

display means for carrying out various kinds of display;

image display control means for displaying a catalog of images on the display means;

template display control means for displaying on the display means the catalog and a template having image insertion areas and added with at least one set of condition specification information that specifies a condition of each of images to be inserted respectively in the image insertion areas and with correspondence information that represents correspondence between the sets of condition specification information for the respective image insertion areas in order to cause the images to be inserted respectively in the image insertion areas with relevance to each other;

selection reception means for receiving selection of any one of the image insertion areas in the template displayed on the display means;

image sifting means for sifting appropriate images that agree with the set or sets of condition specification information for a predetermined one of the image insertion areas from the catalog with reference to the set or sets of condition specification information for the predetermined image insertion area in the case where the predetermined image insertion area has been selected, and for sifting, in the case where another one of the image insertion areas is selected after selection of the image to be inserted in the predetermined image insertion area, appropriate images that agree with the set or sets of condition specification information for the selected image insertion area from the catalog according to the correspondence information used for referring to the set or sets of condition specification information for the selected image insertion area corresponding to the set of condition specification information for the image to be inserted in the predetermined image insertion area; and image selection means for receiving selection of the images to be inserted respectively in the image insertion areas from the appropriate images. The template is used as photo album paper.

A first image editing method of the present invention comprises the steps of:

displaying a catalog of images on display means;

displaying on the display means a template having at least one image insertion area and added with condition specification information that specifies a state of an image or respective images to be inserted in the image insertion area or areas, together with the catalog;

receiving selection of the image insertion area or any one of the image insertion areas in the template displayed on the display means;

sifting appropriate images that agree with the condition specification information for the selected image insertion area from the catalog, with reference to the condition specification information for the selected image insertion area; and receiving selection of the image to be inserted in the selected image insertion area from the appropriate images. The template is used as photo album paper.

A second image editing method of the present invention comprises the steps of:

displaying a catalog of images on display means;

displaying on the display means a template having at least one image insertion area and added with a plurality of sets of condition specification information that specify a condition of an image or each of images to be inserted in the image insertion area or areas, together with the catalog;

receiving selection of the image insertion area or any one of the image insertion areas in the template displayed on the display means;

sifting appropriate images that agree with at least one of the sets of condition specification information for the selected image insertion area from the catalog, with reference to the set or sets of condition specification information among the sets of condition specification information for the selected image insertion area; and receiving selection of the image to be inserted in the selected image insertion area from the appropriate images. The template is used as photo album paper.

A third image editing method of the present invention comprises the steps of:

displaying a catalog of images on display means;

displaying on the display means the catalog and a template having image insertion areas and added with at least one set of condition specification information that specifies a condition of each of images to be inserted respectively in the image insertion areas and with correspondence information that represents correspondence between the sets of condition specification information for the respective image insertion areas in order to cause the images to be inserted respectively in the image insertion areas with relevance to each other;

receiving selection of any one of the image insertion areas in the template displayed on the display means;

sifting appropriate images that agree with the set or sets of condition specification information for a predetermined one of the image insertion areas from the catalog with reference to the set or sets of condition specification information for the predetermined image insertion area in the case where the predetermined image insertion area has been selected, and for sifting, in the case where another one of the image insertion areas is selected after selection of the image to be inserted in the predetermined image insertion area, appropriate images that agree with the set or sets of condition specification information for the selected image insertion area from the catalog according to the correspondence information used for referring to the set or sets of condition specification information for the selected image insertion area corresponding to the set of condition specification information for the image inserted in the predetermined image insertion area; and receiving selection of the images to be inserted respectively in the image insertion areas from the appropriate images. The template is used as photo album paper.

The first to third image editing methods of the present invention may be provided as programs for causing a computer to execute the image editing methods.

According to the first image editing apparatus and the first image editing method of the present invention, the catalog of the images and the template are displayed on the display means, and the selection of the image insertion area input by an operator is received. The condition specification information for the selected image insertion area is then referred to for sifting the appropriate images that agree with the condition specification information for the selected image insertion area from the catalog. Therefore, the operator carrying out an editing operation can easily select the image to be inserted in the selected image insertion area with reference to the appropriate images having been subjected to the screening. Consequently, a burden on the operator can be reduced at the time of selection of the image or images to be inserted in the image insertion area or areas.

If only one set of the condition specification information is added to each of the image insertion areas in the template, the images of various kinds cannot be dealt with flexibly in some cases. Therefore, if the image insertion area or each of the image insertion areas in the template is added with the sets of condition specification information as in the second image editing apparatus and the second image editing method of the present invention, the template can solely deal with the various kinds of images by sifting the appropriate images agreeing with at least one of the sets of condition specification information for the image insertion area or each of the image insertion areas.

In the case where the number of the image insertion areas in the template is greater than 1, correspondence may need to be considered between the images inserted in the respective image insertion areas. For example, in the case where the template has two facing pages, the state of each of the images may be different, depending on whether the image is placed on the right or left page. More specifically, in the case of inserting images of the faces of the bride and groom, it is preferable for the faces on the left page and on the right page to face to the right and to the left, respectively. Furthermore, in the case where the number of the image insertion areas in one page in the template is greater than 1, if an image of a bride dressed in white is inserted in one of the image insertion areas, an image of the bride dressed in another color or kimono is generally not inserted in the same page. In addition, it is also general for an image photographed indoors, such as an image in a chapel, not to be mixed in the same page with an image photographed outside in fine weather.

For this reason, in the case where the template has the image insertion areas each having the set or sets of condition specification information and is added with the correspondence information representing correspondence between the sets of condition specification information for the respective image insertion areas as in the third image editing apparatus and the third image editing method of the present invention, if a predetermined one of the image insertion areas is selected, the appropriate images agreeing with the set or sets of condition specification information are sifted form the catalog with reference to the set or sets of condition specification information of the predetermined image insertion area. If another one of the image insertion areas is selected after selection of the image inserted in the predetermined image insertion area, the correspondence information is used for referring to the set or sets of condition specification information for the image insertion area corresponding to the image inserted in the predetermined image insertion area, and the appropriate images agreeing with the set or sets of condition specification information are sifted from the catalog. In this manner, the images that are suitable for the image insertion areas can be selected.

Note that the program of the present invention may be provided being recorded on a computer readable medium. Those who are skilled in the art would know that computer readable media are not limited to any specific type of device, and include, but are not limited to: CD's, RAM's ROM's, hard disks, and magnetic tapes, in which computer instructions can be stored. Additionally, the computer instructions include, but are not limited to: source, object, and executable code, and can be in any language, including higher level languages, assembly language, and machine language.

BRIEF DESCRIPTION OF THE DRAWINGS

FIG. 1 a block diagram showing the configuration of an image editing system comprising an image editing apparatus of an embodiment of the present invention;

FIG. 2 is a block diagram showing the configuration of a photo album editing PC;

FIG. 3 shows an example of an editing screen;

FIG. 9 shows condition specification information related to image insertion areas in a second embodiment of the present invention;

FIGS. 10A and 10B show examples of images used in the second embodiment;

FIG. 11 shows an example of correspondence information in a third embodiment of the present invention;

FIG. 16 shows an example of correspondence information in the fourth embodiment;

FIG. 17 shows conditions included in condition specification information sets 1-1 and 1-2 for an image insertion area 1-*a*;

FIG. 18 shows conditions included in condition specification information sets 2-1 through 2-4 for an image insertion area 2-*a*;

FIG. 19 shows conditions included in condition specification information sets 3-1 through 3-6 for an image insertion area 2-*b*;

FIGS. 21A and 21B show a first case of a procedure for image selection in the fourth embodiment;

FIGS. 22A and 22B show a second case of the procedure for image selection in the fourth embodiment;

DESCRIPTION OF THE PREFERRED EMBODIMENTS

Figure 4:
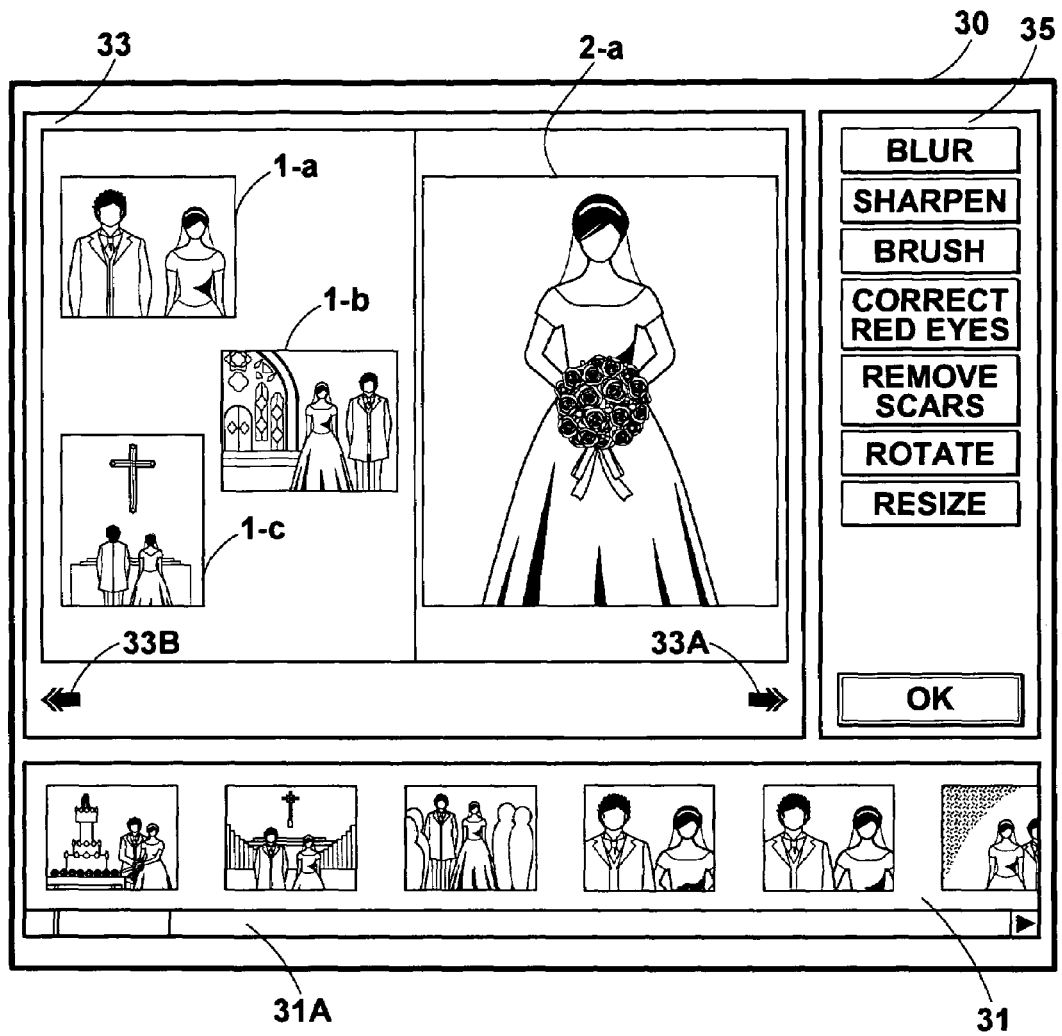
FIG. 4 shows condition specification information related to image insertion areas in the first embodiment.

Hereinafter, embodiments of the present invention will be described with reference to the accompanying drawings. FIG. 1 is a block diagram showing the configuration of an image editing system having an image editing apparatus of a first embodiment of the present invention. As shown in FIG. 1, the image editing system in this embodiment comprises a photo album editing personal computer (hereinafter referred to as the photo album editing PC) 1, a plurality (2, in this case) of mini-laboratories 3A and 3B, a scanner 3C, a file server 5, and a process management PC 7 connected to each other via a network. The photo album editing PC 1 has functions of the image editing apparatus as the embodiment of the present invention. Each of the mini-laboratories 3A and 3B has a scanner for obtaining image data sets representing images recorded on a developed negative or positive film or prints by reading the images from the film or prints, and a printer for printing the image data sets. The file server 5 has a large-capacity hard disc for storing the image data sets. The process management PC 7 manages processes of photo album generation.

In this embodiment, the case of a wedding as an event will be described. At the wedding, a professional photographer photographs the bride and groom who requested photo album generation (hereinafter referred to as a user) on the day of their wedding, and the photographer generates a photo album telling a story of the event by using the photographs. However, the event is not necessarily limited to a wedding.

FIG. 2 is a block diagram showing the configuration of the photo album editing PC 1. As shown in FIG. 2, the photo album editing PC 1 comprises a CPU 11 (acting as the image display control means, the template display control means, and the image sifting means), transceiver means 13 for networking, display means 15, an I/O 19, memories 21, and storage means 23. The CPU 11 controls the photo album editing PC 1. The transceiver means 13 sends and receives various kinds of information including the image data sets to and from the file server 5. The display means 15 displays various kinds of information such as the images and a template. The I/O 19 reads various kinds of information input by an operator via input means 17 (acting as the selection reception means and the image selection means) for delivering the information to the CPU 11. The I/O 19 also outputs a display instruction to the display means 15 according to an instruction from the CPU 11. The memories 21 comprise a ROM storing a program for operating the CPU 11 and various constants, and a RAM used by the CPU 11 as a workspace. The storage means 23 comprises a hard disc or the like for storing various kinds of information such as the image data sets.

A bus 25 connects the CPU 11 in the photo album editing PC 1 to peripheral circuits including the transceiver means 13, the I/O 19, the memories 21, and the storage means 23. In this manner, the CPU 11 can control the peripheral circuits. More specifically, the CPU 11 controls the transceiver means 13, the display means 15, the memories 21, and the storage means 23 to receive information such as the image data sets and a template data set that will be described later from the file server 5, for storing the image data sets in the storage means 23, and for displaying a catalog and the template on the display means 15. In this manner, selection of an image or images to be inserted in an image insertion area or image insertion areas (hereinafter referred to as the image insertion areas) of the template and generation and transmission of image editing information to the file server 5 can be carried out in response to an instruction input from the input means 17 by the operator.

The photo album editing PC 1 receives photo album editing information comprising information on the template selected by the user who requested photo album generation and a user ID, when the operator carries out a photo album editing operation. The photo album editing PC 1 sends the photo album editing information to the file server 5, and receives the template data set, the image data sets, and guide image data sets to be inserted in the image insertion areas in the template from the file server 5. The photo album editing PC 1 then reduces the image data sets for generating the catalog of the images represented by the image data sets, and inserts guide images represented by the guide image data sets in the image insertion areas of the template represented by the template data set. In this manner, the photo album editing PC 1 displays an editing screen including the catalog and the template having the guide images inserted therein on the display means 15.

FIG. 3 shows an example of the editing screen. As shown in FIG. 3, an editing screen 30 includes a catalog display field 31 in which the catalog is displayed, a template display field 33 in which the template having the guide images inserted therein is displayed, and a tool box 35.

A scroll bar 31A is displayed in the catalog display field 31. By moving the scroll bar 31A to the right or left, a part of the images that cannot be displayed in one screen can be displayed.

In the example shown in FIG. 3, a template T1 displayed in the template display field 33 includes 4 image insertion areas named 1-*a*, 1-*b*, 1-*c*, and 2-*a*, all of which respectively have the guide images inserted therein.

The guide images notify the operator who carries out the photo album editing operation of what composition the respective images should have in the corresponding image insertion areas in the template. In the case of photography for generating photo albums of events, the photography is carried out at the same place and in the same situation regardless of who a user as a requester is. For example, in the case of photography of brides and grooms in weddings, photography is carried out at a predetermined place in a hotel and in a predetermined situation such as exchange of marriage rings and cutting a wedding cake.

Therefore, by using the same composition for the images to be inserted in the image insertion areas in the template for all users that selected the same template, a quality of photo albums generated in the above manner can be constant. Consequently, the guide images can be illustrations representing the composition to be inserted in the image insertion areas, drawings, or sample images obtained by photography of a model in an actual place or in an actual situation, for example. In this embodiment, sample images generated by photographing a model are inserted in the image insertion areas 1-*a*, 1-*b*, 1-*c*, and 2-*a*.

In the template display field 33 are displayed arrow buttons 33A and 33B for changing a page of the template being displayed in the template display field 33 in the case where the template has a plurality of pages. The operator can change the page of the template to be displayed in the editing screen 30 by clicking the arrow button 33A or 33B.

In the tool box 35 are displayed buttons for carrying out image quality changing processing such as blurring, sharpening, and brushing, buttons for carrying out image restoration processing such as red-eye correction and scar removal, buttons for carrying out reshaping processing such as rotation and resizing, and an OK button for ending the processing.

In this embodiment, the template data set is added with condition specification information sets for specifying a state of the images to be inserted in the respective image insertion areas of the template represented by the template data set. For example, condition specification information sets 1 to 4 are recorded in a header of the template data set for specifying the state of the images to be inserted in the image insertion areas 1-*a*, 1-*b*, 1-*c*, and 2-*a* of the template T1 represented by the template data set, as shown in FIG. 4.

The condition specification information sets comprise conditions for determining the state of the images that are appropriate for insertion in the respective image insertion areas, according to the respective image insertion areas. More specifically, in the case where the subject is people, conditions for eliminating unnecessary images (such as an image of people with closed eyes or red eyes, an image of people facing sideways, and an image not including a predetermined number of people) are used as the condition specification information sets. Furthermore, the condition specification information sets may comprise conditions for inclusion of necessary images such as an image with a specific subject (a church or the ocean, for example), an image of two people, and an image of a person holding red flowers. The condition specification information sets may also include conditions for specifying a state of only a part of an image so that an image whose part such as a center part satisfies the condition can be sifted.

For example, in the case where the image insertion area 1-*a* needs to be filled with close-up of the faces of the bride and groom, the image to be selected for insertion therein should include the bride and groom with open eyes but without red eyes caused by flash, and not facing sideways.

For this reason, the condition specification information set 1 for the image insertion area 1-*a* includes the following conditions (1) to (4):

(1) The image includes two people within a predetermined distance.
(2) The people in the image do not have their eyes closed.
(3) The people are not facing sideways.
(4) The people do not have red eyes.

When the operator clicks any one of the image insertion areas, the photo album editing PC 1 refers to the condition specification information set for the selected image insertion area, and sifts the images that satisfy the conditions in the condition specification information set (hereinafter referred to as appropriate images) from the catalog of the images displayed in the catalog display field 31. More specifically, the appropriate images are discriminated by changing a color of a frame thereof, or by preventing selection of the images other than the appropriate images, or by including only the appropriate images in the catalog, for example.

In the case where the operator has selected the image insertion area 1-*a*, the photo album editing PC 1 firstly extracts face areas from all the images represented by the image data sets. The face areas can be extracted through detection of circular skin-color areas in all the images. The photo album editing PC 1 then counts the number of the face areas in each of the image data sets, and selects the images each having the face areas for the two people separated within the predetermined distance as the images satisfying the condition (1).

The photo album editing PC 1 then detects positions of eyes in the face areas in the images that satisfy the condition (1), based on relationships between positions of eyes, mouths, and noses in human faces. The photo album editing PC 1 then judges whether or not white areas corresponding to the whites of eyes are present at the detected positions, and sifts the images having the white areas as the images that satisfy the condition (2).

The photo album editing PC 1 then sifts the images having the two positions of eyes in each of the face areas among the images that satisfy the condition (2), as the images that satisfy the condition (3), representing people not facing sideways.

The photo album editing PC 1 finally judges whether or not a red area is present inside of the white areas at each of the detected eye positions in the images that satisfy the condition (3), and sifts the images having no red areas as the appropriate images for the condition (4), that is, the appropriate images for the condition specification information set 1.

Figures 5, 6:
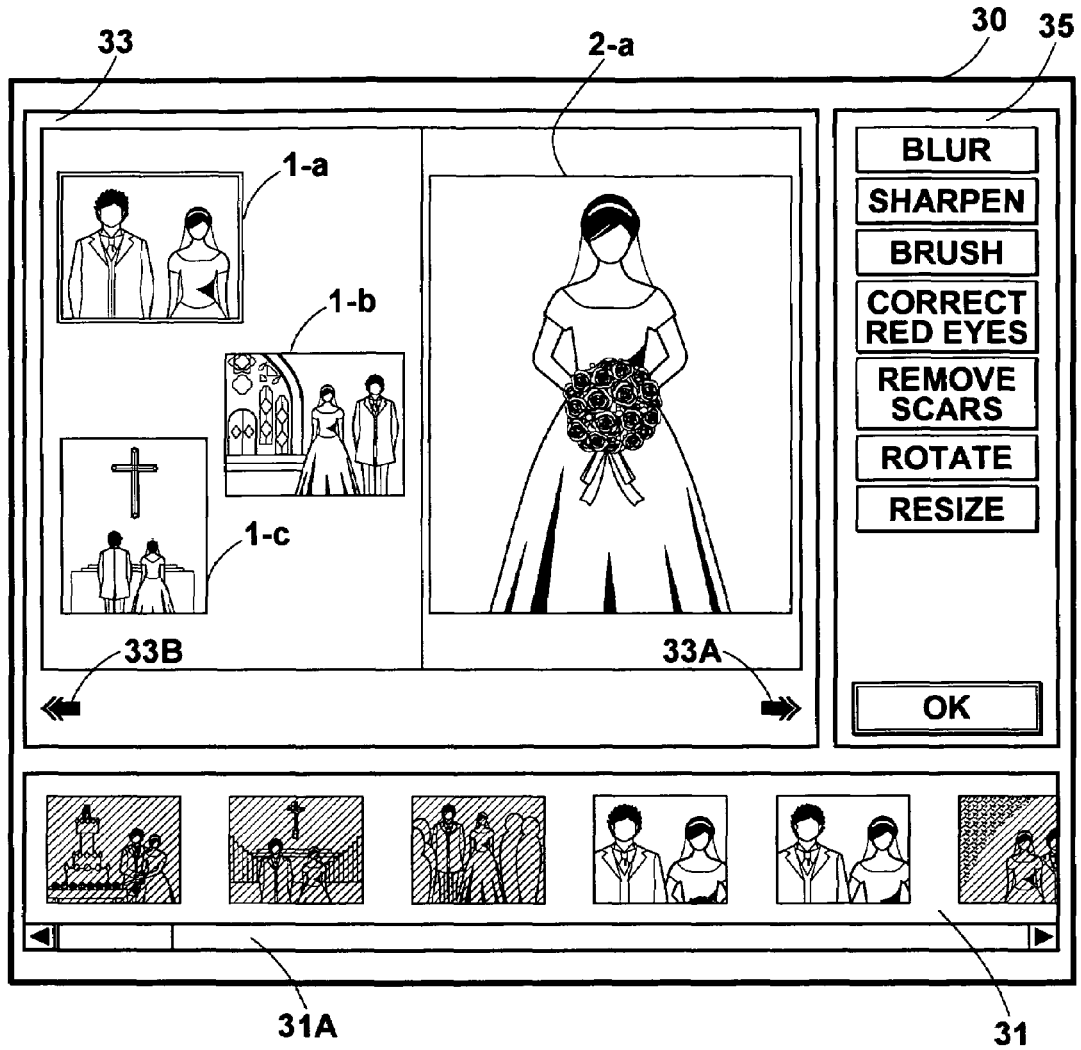
FIG. 5 shows the editing screen in which appropriate images have been screened.
FIG. 6 shows an example of layout information.

FIG. 5 shows an editing screen having the appropriate images for the image insertion area 1-*a*. As shown in FIG. 5, in the case where the image insertion area 1-*a* has been selected, the color of a frame of the image insertion area 1-*a* in the template display field 33 becomes different from that of the other image insertion areas, and selection of the images other than the appropriate images for the image insertion area 1-*a* (shown by hatched areas) is prevented in the catalog of the images displayed in the catalog display field 31. In this manner, the appropriate images are distinguished. Alternatively, all the images may be selectable in the catalog. In this case, however, if the operator selects any one of the images other than the appropriate images, the operator is requested to change to another one of the images or to correct the image, or a warning sound is issued.

The condition specification information set 2 for the image insertion area 1-*b* may include conditions that the image to be inserted therein has two people and that the image includes stained glass. According to the conditions, the appropriate images can be sifted. In this case, a correlation value may be calculated between a template having a shape of stained glass and each of the images represented by the image data sets. The images having the correlation value greater than or equal to a predetermined threshold value are then sifted as the images that satisfy the condition of inclusion of stained glass.

The condition specification information set 3 for the image insertion area 1-*c* may include a condition of presence of a cross, and the appropriate images are sifted according to the condition specification information set. In this case, a correlation value may be calculated between a template having a shape of a cross and each of the images represented by the image data sets. The images having the correlation value greater than or equal to a predetermined threshold value are then sifted as the images that satisfy the condition of inclusion of a cross.

The condition specification information set 4 for the image insertion area 2-*a* may include a condition that the image have one person, a condition that the person is dressed in white, and a condition that the person is holding red flowers at the center thereof. The appropriate images can be sifted for the image insertion area 2-*a* according to these conditions. In this case, a human face is extracted first from each of the images. The appropriate images can then be sifted as the images having a white area below the face and having a red area at the center thereof.

The condition specification information sets are not necessarily limited to the information sets described above. For example, in the case of sifting class-photo images, a condition that the number of people therein is greater than or equal to a predetermined number is included in the condition specification information sets therefor.

In the case where any one of the condition specification information sets includes a plurality of conditions as in the condition specification information set 1, the images satisfying not all the conditions but an indispensable part of the conditions may be sifted as the appropriate images. For example, in the conditions (1) to (4) described above, the images satisfying the conditions (1) to (3) but not satisfying the condition (4) may be sifted as the appropriate images, since red eyes in the condition (4) can be corrected through image processing. Furthermore, the appropriate images may be sifted after predetermining points to be given for satisfaction of the respective conditions. In this case, the points are added at each time the corresponding condition is satisfied, and the appropriate images are sifted according to the points thereof exceeding a predetermined value. For the conditions such as red eyes that can be corrected, the images may be corrected in advance before screening according to the condition specification information set.

In the case of sifting the images having main figures such as bride and groom, the images may respectively include other people with closed eyes or red eyes around the main figures. In this case, since the main figures are often included at the center of the respective images, the images are screened by adopting the conditions such as no red eyes and no closed eyes for the people at the center of the images.

The condition specification information sets may include a condition on a position of a subject in the images, such as a condition that a person dressed in white is in a predetermined image area. Furthermore, the condition specification information sets may also include a condition on a degree of inclination of a subject, such as a condition that a person dressed in white is inclined by 60 degrees from a horizontal line.

The condition specification information sets may also include a condition defining an image quality such as graininess of human skin and color information (brightness, lightness, and saturation) of a subject to be included. For the graininess of skin, a frequency component of a face area is found, and a condition is included that the appropriate images should have amplitude of frequency (representing the graininess) less than or equal to a threshold value. For the remaining images whose frequency amplitude of the skin graininess exceeds the threshold value, processing for reducing the graininess may be carried out thereon so that the images can satisfy the condition of graininess.

In the case where the graininess of skin is found, the appropriate images may be sorted in order of graininess (from lower to higher) so that the sorted images are included in the catalog in this order.

For the condition of excluding images having people facing sideways, the images may be sorted according to a degree of how much a face looks sideways so that the images can be included in the catalog in order of the degree (that is, from the lower degree of facing sideways). The degree may be detected by template matching using templates of faces facing different directions. In this case, the degree is determined according to the direction of the face in the template showing the largest agreement with the face in each of the images.

Moreover, a face and eyes may be detected in each of the images so that the direction of the face can be found by detecting positions of the eyes relative to the face, a position of the midpoint of the line connecting the eyes, and an angle of a perpendicular line passing the midpoint. In this case, the direction of the face is determined by the angle of the perpendicular line.

In addition, the direction of the face may be detected by machine learning results using boosting or a neural network, for example. In this case, recognizers which have learned directions of faces are prepared, and the direction of the face in each of the images is detected by using the recognizers. The direction of the face in each of the images is determined to be the direction of the face recognized by the recognizer outputting the largest response.

The operator carries out the photo album editing operation by inputting photo album editing instructions while using the editing screen 30. More specifically, the operator selects any one of the images having the same composition as the guide image inserted in the selected image insertion area from the appropriate images, and drags and drops the selected image by using the input means 17. In this manner, the operator inserts the selected image in the image insertion area. After the insertion, the operator selects the image insertion area, and edits the selected image inserted therein by clicking any one of the buttons in the tool box 35. For example, by clicking the button for rotation, the operator can rotate the image by 90 degrees in the clockwise direction. By clicking the button for resizing, a size of the image can be changed. Furthermore, by clicking the button for blurring or sharpening or brushing, a quality of the image can be changed. By clicking the button for red-eye correction or scar removal, the image can be restored.

In the case where the image inserted in the image insertion area includes a person or people, if the operator selects a face therein by using the input means 17 at the time of editing, a parameter for carrying out image processing may also be specified in order to improve skin color, reduce sharpness, or reduce graininess, for example. In the case where a person is holding red flowers, a parameter for improving saturation of the red color may also be specified. In this case, the tool box 35 has a button for specifying such a parameter.

In the case where the image having been selected for the image insertion area is sifted as one of the appropriate images agreeing with the condition specification information set for another one of the image insertion areas, prevention of selection of the image for the latter image insertion area is preferable.

After selecting all the images to be inserted in the respective image insertion areas and editing all the selected images, the operator clicks the OK button to end the photo album editing operation using the template. The photo album editing PC 1 generates the image editing information including file names of the selected images, information relating the file names of the images to be inserted in the respective image insertion areas to the corresponding image insertion areas, information on the processing to be carried out on the image data sets such as blurring, enlargement or reduction and red-eye correction, information representing a trimming range in the case of trimming, and information on a magnification ratio in the case of enlargement or reduction. The image editing information is sent to the file server 5.

The image editing information may be stored in the photo album editing PC 1 not only after clicking of the OK button by the operator but also temporarily for each order of photo album generation so that the image editing information can be sent regularly to the file server 5 at predetermined intervals. The image editing information may be generated and sent to the file server 5 at the time of generation of information regarding the processing on any one of the image insertion areas or regarding each of the pages in the template if the template has the pages.

In the case where the editing operation is temporarily suspended during selection of the images to be inserted in the respective image insertion areas, the suspension may be notified in the editing screen 30. Furthermore, a list or thumbnail images of orders being processed may be displayed on the display means 15 of the photo album editing PC 1 so that the operator is notified of the processing that has not been finished. In the case of suspension of the editing operation, the step to which the operation has been carried out may be stored so that the step is displayed first in the editing screen 30 at the time of resumption of the operation.

The file server 5 stores the image data sets obtained by reading the images recorded on the developed film by using the mini-laboratory 3A or 3B or the scanner 3C. The image data sets are stored in a folder generated for the user who requested the photo album generation. The file server 5 also stores template data sets to be used for photo album generation including the template data set representing the template for the user, as well as the guide image data sets representing the guide images to be inserted in the image insertion areas.

The file server 5 refers to the photo album editing information sent from the photo album editing PC 1, and sends the template data set representing the template selected by the user, the image data sets stored in the folder corresponding to the user ID, and the guide image data sets representing the guide images to be inserted in the image insertion areas in the selected template to the photo album editing PC 1.

When the image editing information is sent from the photo album editing PC 1, the file server 5 refers to the file names of the image data sets representing the selected images included in the image editing information, and carries out preparatory processing and editing processing on the selected image data sets for generating processed image data sets. The preparatory processing includes at least one of: brightness correction processing, color correction processing, and gradation correction processing on the selected image data sets. The editing processing includes the processing specified by the image editing information. More specifically, the editing processing includes the processing for image quality change such as blurring, sharpening, and brushing, the processing for reshaping the images such as trimming and enlargement or reduction, and the image restoration processing such as red-eye correction and blurring on the image data sets specified by the image editing information, in the case where the processing described above is specified in the image editing information.

The file server 5 generates layout information from the information relating the file names of the image data sets and the image insertion areas of the template included in the image editing information. FIG. 6 shows an example of the layout information. As shown in FIG. 6, the layout information relates the names of the image data sets (DSCF0012.jpg, DSCF0020.jpg, DSCF0023.jpg, and DSCF0030.jpg) and the corresponding image insertion areas 1-a, 1-b, 1-c, and 2-a in the template T1. The file server 5 sends the processed image data sets and the layout information to either the mini-laboratory 3A or 3B.

The process management PC 7 receives information representing completion of the processes such as the photo album editing operation, printing, and photo album inspection input by the operator, in order to manage the processes regarding each order for photo album generation. In the case where the photo album has passed the inspection carried out by the operator for examining the quality of the generated photo album, the process management PC receives information thereon, and finishes the process management for the photo album. In the case where the photo album did not pass the inspection, the process management PC 7 receives an instruction for generating the photo album again.

Figure 7:
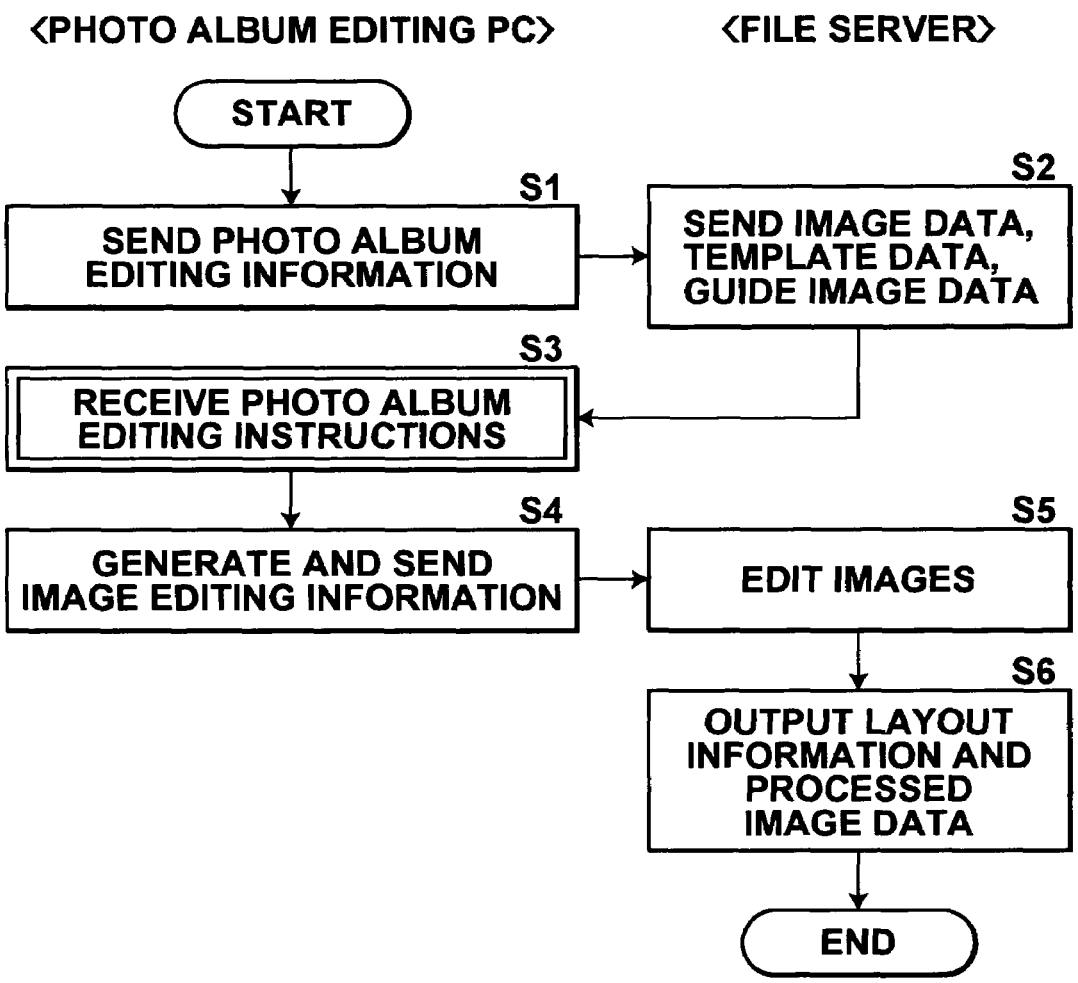
FIG. 7 is a flow chart showing a procedure carried out in the first embodiment.

A procedure carried out in the first embodiment will be described next. FIG. 7 is a flow chart showing the procedure in the first embodiment. The file server 5 has already stored the image data sets obtained by reading the images from the developed film recorded with photographs on the wedding of the user. The photo album editing information comprising the user ID and the information on the template selected by the user as well as information on the event regarding which the user has requested photo album generation have been input to the photo album editing PC 1.

When the operator inputs a photo album editing instruction from the photo album editing PC 1, the procedure starts. The photo album editing PC 1 sends the photo album editing information including the user ID and the information on the template selected by the user to the file server 5 (Step S1).

The file server 5 receives the photo album editing information, and sends the image data sets stored in the folder corresponding to the user ID, the template data set representing the template selected by the user, and the guide image data sets representing the guide images to be inserted in the image insertion areas in the template to the photo album editing PC 1 (Step S2).

The photo album editing PC 1 receives the image data sets, the template data set, and the guide image data sets, and receives the photo album editing instructions (Step S3).

Figure 8:
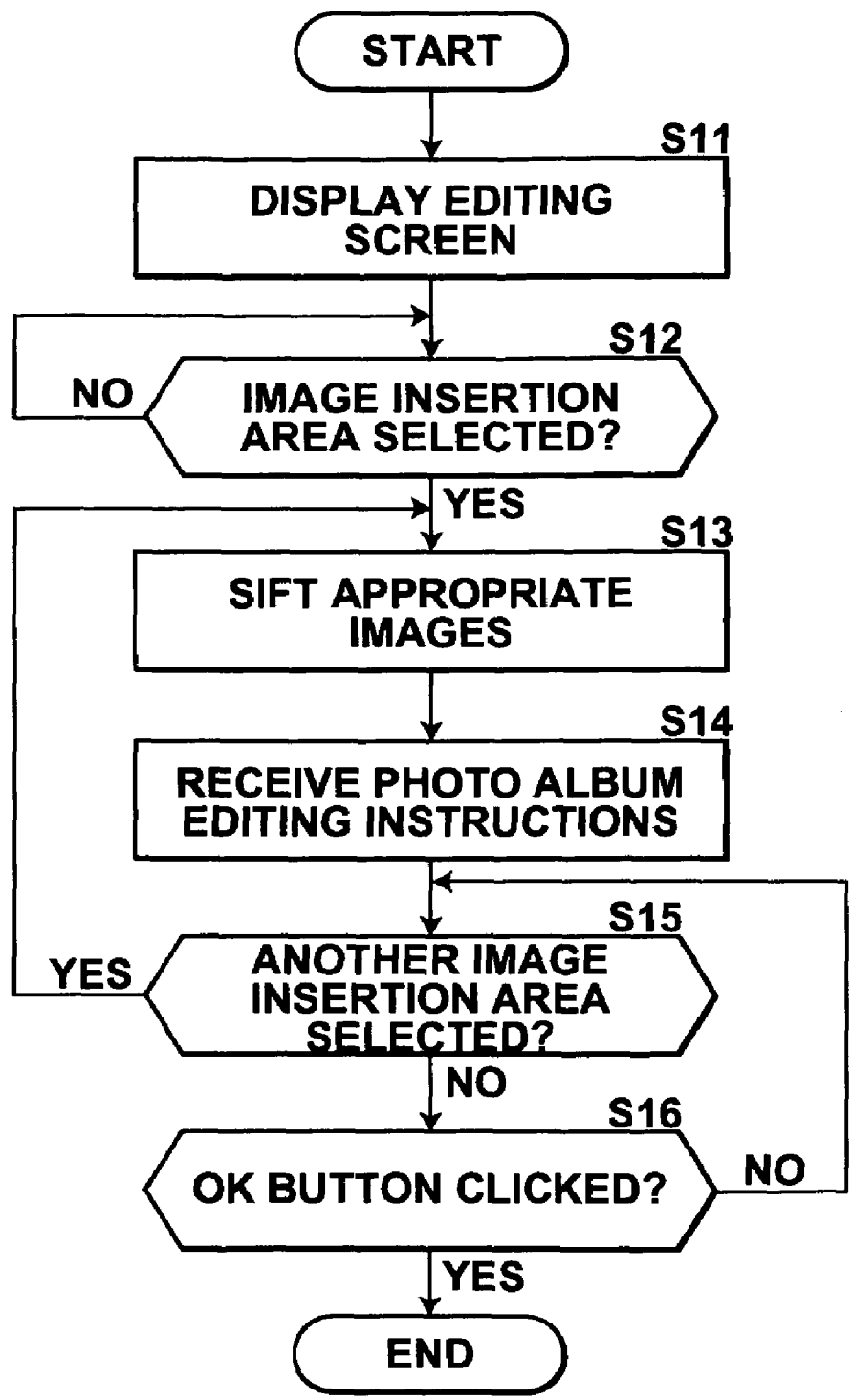
FIG. 8 is a flow chart showing a procedure for receiving photo album editing instructions in the first embodiment.

FIG. 8 is a flow chart showing a procedure for receiving the photo album editing instructions. The photo album editing PC 1 displays the editing screen 30 on the display means 15 (Step S81). The guide images represented by the guide image data sets are inserted in the corresponding image insertion areas in the template displayed in the template display field 33. The photo album editing PC 1 starts monitoring of whether or not the operator has selected any one of the image insertion areas (Step S12). If a result at Step S12 is affirmative, the photo album editing PC 1 refers to the condition specification information set for the selected image insertion area, and sifts the appropriate images that agree with the condition specification information set (Step S13). The photo album editing PC 1 receives the photo album editing instruction input by the operator referring to the appropriate images (Step S14).

The photo album editing PC 1 then starts monitoring of whether or not the operator has selected another one of the image insertion areas (Step S15). If a result at Step S15 is affirmative, the procedure returns to Step S13, and the procedure at Step S13 and later is repeated for selecting the appropriate images with reference to the condition specification information set for the selected image insertion area. If the result at Step S15 is negative, the photo album editing PC 1 judges whether or not the OK button has been clicked (Step S16). If a result at Step S16 is negative, the procedure returns to Step S15. If the result at Step S16 is affirmative, the photo album editing PC 1 ends the procedure for receiving the photo album editing instructions.

The photo album editing PC 1 generates the image editing information, and sends the image editing information to the file server 5 (Step S4 in FIG. 7).

The file server 5 receives the image editing information, and carries out the editing processing by referring to the file names of the selected image data sets included in the image editing information (Step S5). The file server 5 sends the processed image data sets generated through the editing processing and the layout information generated from the image editing information to either the mini-laboratory 3A or 3B (Step S6) to end the procedure.

The mini-laboratory 3A or 3B receives the processed image data sets and the layout information, and prints the processed image data sets for generating prints thereof. The operator (or an operator dedicated to photo album binding) pastes the prints in print insertion areas in photo album paper corresponding to the template while referring to the layout information, and carries out binding to generate the photo album.

The operator in charge of quality control inspects the photo album generated in this manner. In the case where the photo album has passed the inspection, the photo album is sent to the user. In the case where the photo album did not pass the inspection, the operator instructs generation of the photo album again by using the process management PC 7.

In the first embodiment, when the operator selects any one of the image insertion areas in the template displayed in the editing screen 30, the appropriate images that agree with the condition specification information set for the selected image insertion area are sifted from the catalog of the images, as has been described above. Therefore, the operator can easily select the image to be inserted in the selected image insertion area by referring to the appropriate images. Therefore, the burden on the operator can be reduced at the time of selection of the images to be inserted in the respective image insertion areas.

In the first embodiment, one set of condition specification information is related to one image insertion area, as shown in FIG. 4. However, one image insertion area may be related to a plurality of sets of condition specification information, which will be described below as a second embodiment of the present invention. FIG. 9 shows condition specification information sets related to image insertion areas in the second embodiment. As shown in FIG. 9, condition specification information sets 1-1 to 1-3, 2-1 and 2-2, 3-1 to 3-3, and 4-1 to 4-3 are recorded in a header of a template data set representing a template T2, for specifying conditions of images to be inserted respectively in image insertion areas 1-a, 1-b, 1-c, and 2-a in the template T2 in the second embodiment.

In the case where one image insertion area is related to a plurality of sets of condition specification information as in the example in FIG. 9, images agreeing with the respective condition specification information sets are sifted as the appropriate images. For example, if the condition specification information set 2-1 for the image insertion area 1-b includes conditions that the number of people is 2 and the two people have their eyes open while the condition specification information set 2-2 for the image insertion area 1-b includes conditions that the number of people is 2 and the two people have their eyes closed, an image G1 shown in FIG. 10A representing the bride and groom having their eyes open and an image G2 shown in FIG. 19B representing the bride and groom having their eyes closed are both sifted as the appropriate images. Images agreeing with any one of the condition specification information sets may be sifted as the appropriate images.

A template may also be added with correspondence information representing correspondence between condition specification information sets for a plurality of image insertion areas in a template, which will be described below as a third embodiment of the present invention.

FIG. 11 shows an example of the correspondence information in the third embodiment. In the third embodiment is used a template T3 having image insertion areas 1-a and 2-a for right and left pages. As shown in FIG. 11, condition specification information sets 1-1 to 1-3 and 2-1 to 2-3 are added to the image insertion areas 1-a and 2-a while the correspondence information represents correspondence between the condition specification information sets 1-1 and 2-1, 1-2 and 2-2, and 1-3 and 2-3. The correspondence information is recorded in a header of a template data set representing the template T3.

Assume that the condition specification information set 1-1 includes a condition that a person dressed in black faces to the right and the condition specification information set 2-1 corresponding to the condition specification information set 1-1 includes a condition that a person dressed in white faces to the left.

Figure 12A:
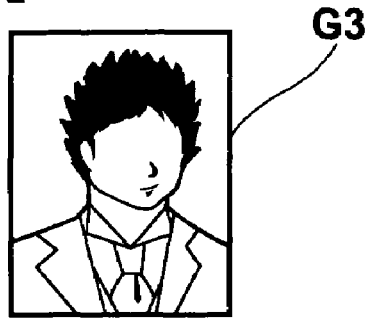
FIGS. 12A to 12C show examples of images used in the third embodiment.
Figure 12B:
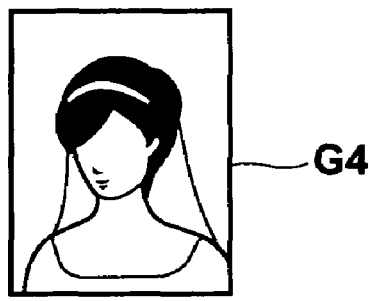
Figure 12C:
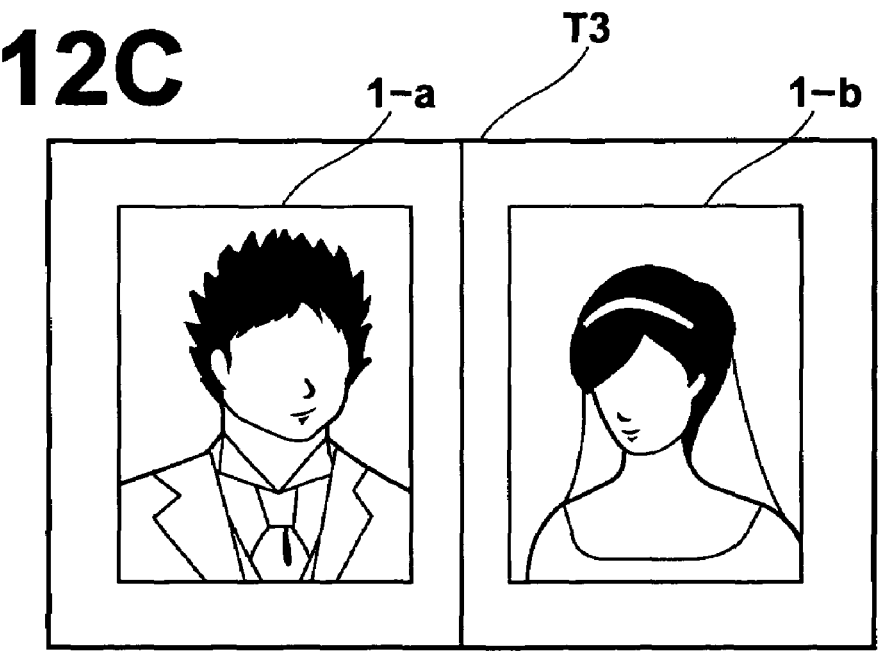

In the case where an operator selects the image insertion area 1-a of the template T3, images representing a person dressed in black and facing to the right are sifted as the appropriate images. If the operator selects the image insertion area 2-a after selecting an image G3 shown in FIG. 12A, images representing a person dressed in white and facing to the left are sifted as the appropriate images. If the operator then selects an image G4 shown in FIG. 12B, a photo album having pages shown in FIG. 12C is generated.

Assume that a template T4 having image insertion areas 1-a and 1-b in one page is used and condition specification information sets 1-1 and 1-2 are related to the image insertion area 1-a while the condition specification information sets 2-1 and 2-2 are related to the image insertion area 2-a. Correspondence information represents correspondence between the condition specification information sets 1-1 and 2-1 and between the condition specification information sets 1-2 and 2-2.

Assume that the condition specification information set 1-1 includes a condition that two people are dressed in kimono while the condition specification information set 1-2 includes a condition that two people are dressed in western style. Assume that the condition specification information set 2-1 includes a condition that two people are dressed in kimono while the condition specification information set 2-2 includes a condition that two people are dressed in western style.

Figure 13A:
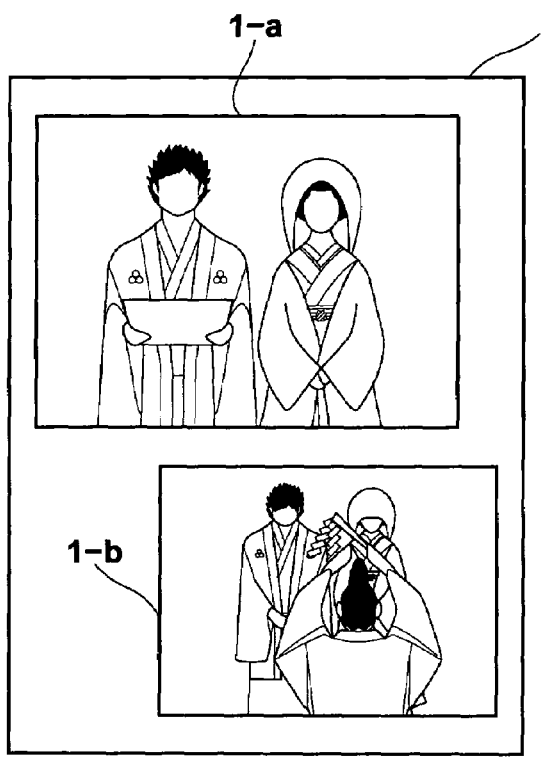
FIGS. 13A and 13B are other examples of images used in the third embodiment.

In this case, when an operator selects the image insertion area 1-a, images including two people dressed in kimonos or in western style dress are sifted as the appropriate images. In the case where the operator selects the image insertion area 1-b after selecting an image representing a scene wherein two people dressed in kimonos are reading a marriage oath as an image to be inserted in the image insertion area 1-a, the photo album editing PC 1 sifts images representing two people dressed in kimonos as the appropriate images, based on the condition specification information set 2-1 corresponding to the condition specification information set 1-1. In this manner, the operator selects the images representing the bride and groom dressed in kimonos as the images to be inserted. Therefore, as shown in FIG. 13A, the images representing the bride and groom dressed in kimonos are inserted in the image insertion areas 1-a and 1-b in the template T3.

Figure 13B:
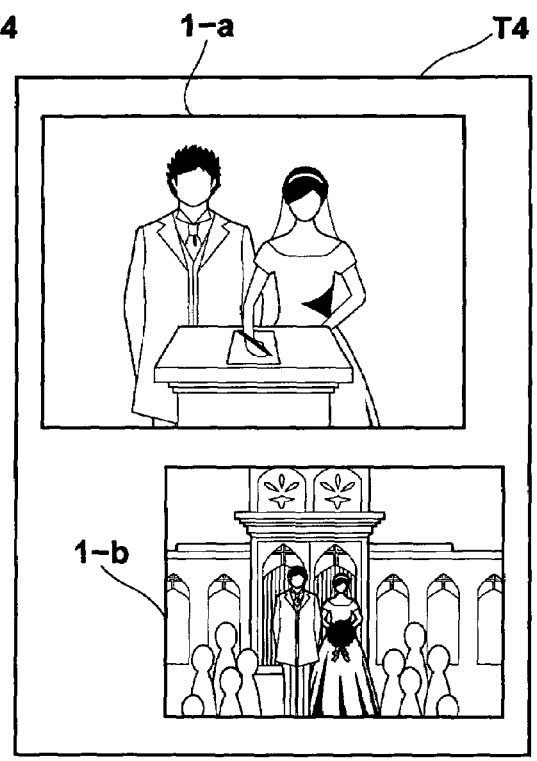

In the case where the operator selects the image insertion area 1-b after selecting an image representing a scene wherein two people dressed in western style dress are signing an oath as the image to be inserted in the image insertion area 1-a, the photo album editing PC 1 sifts images representing two people dressed in western style dress as the appropriate images, based on the condition specification information set 2-2 corresponding to the condition specification information set 1-2. In this manner, the operator selects the images representing the bride and groom dressed in western style dress as the images to be inserted. Therefore, as shown in FIG. 13B, the images representing the bride and groom dressed in western style dress are inserted in the image insertion areas 1-a and 1-b in the template T3.

The case where the number of image insertion area is 3 in a template added with correspondence information representing correspondence between sets of condition specification information for the respective image insertion areas will be described as a fourth embodiment of the present invention.

Figures 14, 15:
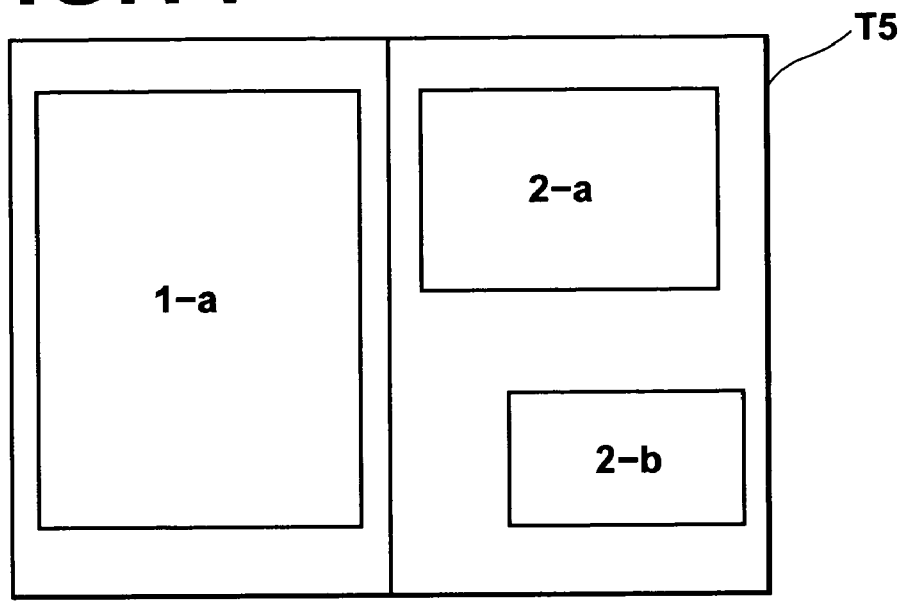
FIG. 14 shows an example of a template used in a fourth embodiment of the present invention.
FIG. 15 shows condition specification information related to image insertion areas in the fourth embodiment.

FIG. 14 shows the template used in the fourth embodiment. As shown in FIG. 14, a template T5 has an image insertion area 1-a for page 1 and two image insertion areas 2-a and 2-b for page 2. In a header of a template data set representing the template T5 is recorded condition specification information sets 1-1 and 1-2 for representing conditions of the image to be inserted the image insertion area 1-a, condition specification information sets 2-1 to 2-4 for representing conditions of the image to be inserted in the image insertion area 2-a, and condition specification information sets 3-1 to 3-6 for representing conditions of the image to be inserted in the image insertion area 2-b.

The template data set representing the template T5 is also added with the correspondence information representing correspondence between the condition specification information sets added to the respective image insertion areas. FIG. 16 shows an example of the correspondence information in the fourth embodiment. As shown in FIG. 16, the correspondence information in the fourth embodiment represents correspondence in 6 combinations between the condition specification information sets 1-1 and 1-2 for the image insertion area 1-a, the condition specification information sets 2-1 to 2-4 for the image insertion area 2-a, and the condition specification information sets 3-1 to 3-6 for the image insertion area 2-b. Numbers 1 to 6 represent the 6 combinations respectively named "chapel wedding 1 (ring exchange 1)", "chapel wedding 2 (ring exchange 2)", "chapel wedding 3 (signing oath 1)", "chapel wedding 4 (signing oath 2)", "reception scene 1 (cutting wedding cake)", and "reception scene 2 (candle lighting service)".

The condition specification information sets 1-1, 2-1, and 3-1 are related to "chapel wedding 1 (ring exchange 1)". The condition specification information sets 1-1, 2-1, and 3-2 are related to "chapel wedding 2 (ring exchange 2)". The condition specification information sets 1-1, 2-2, and 3-3 are related to "chapel wedding 3 (signing oath 1)". The condition specification information sets 1-1, 2-2, and 3-4 are related to "chapel wedding 4 (signing oath 2)". The condition specification information sets 1-2, 2-3, and 3-5 are related to "reception scene 1 (cutting wedding cake)". The condition specification information sets 1-2, 2-4, and 3-6 are related to "reception scene 2 (candle lighting service)".

Conditions included in the condition specification information sets 1-1 and 1-2 for the image insertion area 1-a are shown in FIG. 17 while conditions included in the condition specification information sets 2-1 to 2-4 for the image insertion area 2-a are shown in FIG. 18. Conditions included in the condition specification information sets 3-1 to 3-6 for the image insertion area 2-b are shown in FIG. 19.

Figure 20:
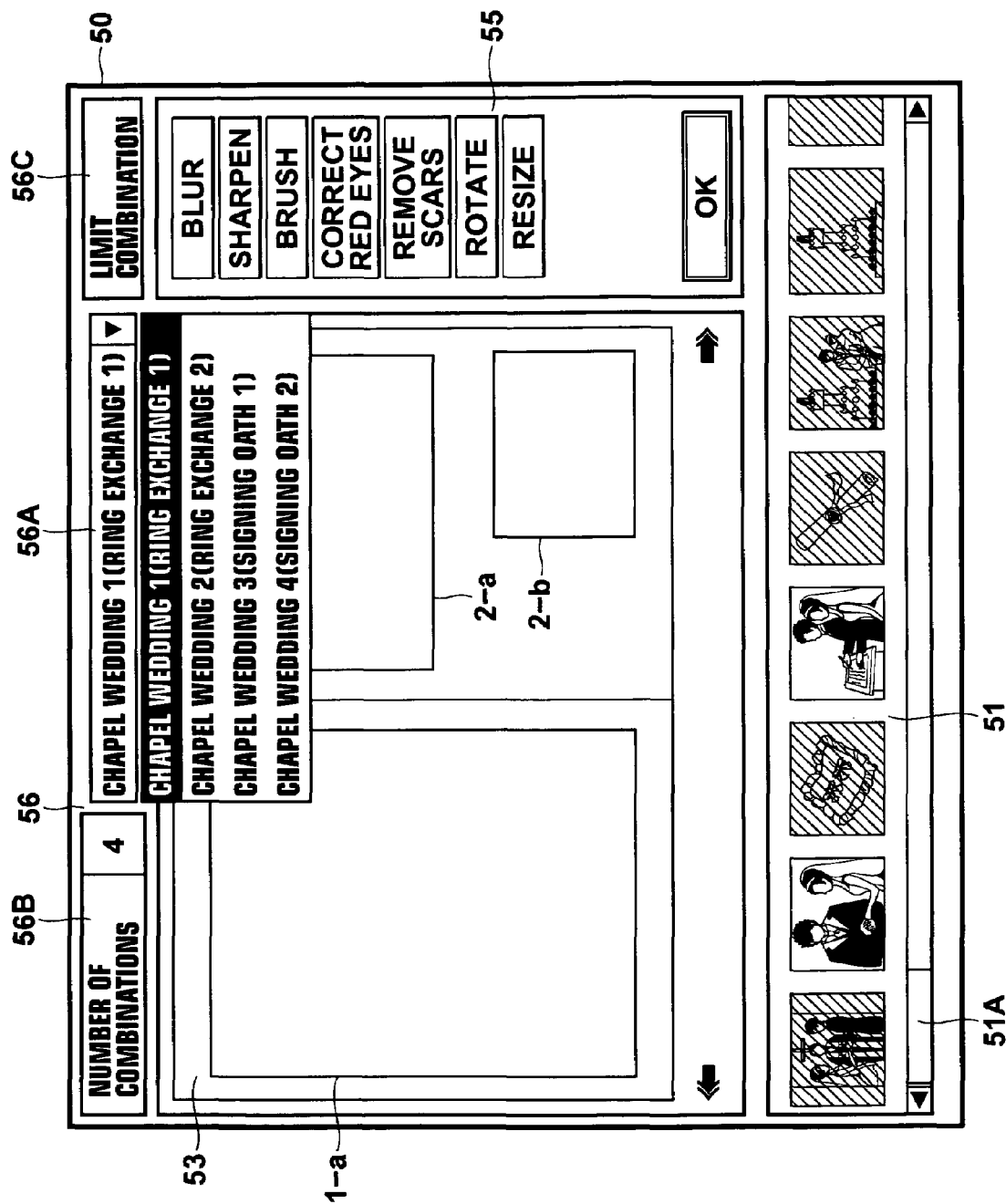
FIG. 20 shows an editing screen in the fourth embodiment.

FIG. 20 shows an editing screen in the fourth embodiment. As shown in FIG. 20, an editing screen 50 has a catalog display field 51 for displaying a catalog of images, a template display field 53 for displaying the template having guide images inserted therein, and a tool box 55. A scroll bar 51A is displayed in the catalog display field 51, and a part of the images that cannot be displayed in one screen can be displayed by moving the scroll bar 51A to the right or left. The editing screen 50 also has a combination specification field 56 for selecting one of the combinations of the condition specification information sets.

The combination specification field 56 comprises a selection field 56A for selecting one of the combinations of the condition specification information sets, a combination quantity display field 56B for displaying the number of the combinations available, and a Limit Combination button 56C for limiting the combinations.

The selection field 56A comprises a pull-down menu. By clicking a triangle, names of the combinations are displayed so that the operator can select a desired one of the combinations. In the combination quantity display field 56B is displayed the number of the combinations reduced according to a state of images inserted in the image insertion areas 1-a, 2-a, and 2-b. For example, if the image insertion area 1-a is selected in a state wherein no images have been selected, all the combinations represented by the correspondence information are available. Therefore, "6" is displayed in the combination quantity display field 56B. In this case, all images agreeing with the condition specification information sets 1-1 and 1-2 are displayed in the catalog display field 51.

FIG. 21 shows a first case of a procedure for image selection in the fourth embodiment. In the case where an image agreeing with the condition specification information set 1-1, that is, an image including a cross and three people among which the person in the left and the person in the right face to the left and right respectively while the person in the middle does not face sideways (an image representing the bride and groom exchanging rings in front of a priest) is selected for the image insertion area 1-a, the combinations available in this case are No. 1 to 4 according to the correspondence information. Therefore, "4" is displayed in the combination quantity display field 56B.

In this state, only the combinations No. 1 to 4, that is, "chapel wedding 1 (ring exchange 1)", "chapel wedding 2 (ring exchange 2)", "chapel wedding 3 (signing oath 1)", and "chapel wedding 4 (signing oath 2)" are selectable in the selection field 56A.

When the operator selects the image insertion area 2-a thereafter, images agreeing with the condition specification information sets 2-1 and 2-2 are sifted.

In the case where an image agreeing with the condition specification information set 2-1, that is, an image including a ring and two people among which the person in the right dressed in white faces to the left while the person in the left does not face sideways (an image of the bride and groom exchanging rings) is selected for the image insertion area 2-a, the combinations available in this case are No. 1 and 2 according to the correspondence information. Therefore, "2" is displayed in the combination quantity display field 56B.

In the case where the image insertion area 2-b is selected in this state, all images agreeing with the condition specification information sets 3-1 and 3-2 are sifted. Therefore, an image agreeing with the condition specification information set 3-1, that is, an image representing hands and a ring (a close-up of hands at the time of ring exchange) or an image including two rings but no people shown in a rectangular area at the center thereof (an image of rings placed on a cushion) as shown in FIG. 21B can be inserted in the image insertion area 2-b.

FIG. 22 shows a second case of the procedure for image selection in the fourth embodiment. The procedure after insertion of an image agreeing with the condition specification information set 1-1 in the image insertion area 1-a will be explained below. In the case where an image agreeing with the condition specification information set 2-2, that is, an image including a white area of parallelogram and two people facing to the left among which the person in the right is dressed in white (an image of the bride and groom signing an oath), is inserted in the image insertion area 2-a after insertion of the image agreeing with the condition specification information set 1-1 in the image insertion area 1-a, the combinations available in this case are No. 3 and 4 according to the correspondence information. Therefore, "2" is displayed in the combination quantity display field 56B. If the image insertion area 2-b is selected in this state, all images agreeing with the condition specification information sets 3-3 and 3-4 are sifted. Therefore, an image agreeing with the condition specification information set 3-3, that is, an image including hands and a white area of parallelogram (a close-up of hands at the time of signing the oath) can be inserted in the image insertion area 2-b. Alternatively, an image having a white area but no people and including a red flower at the center thereof (an image of a signed oath rolled with a ribbon having a red flower) can be inserted in the image insertion area 2-b, as shown in FIG. 22B.

Figure 23:
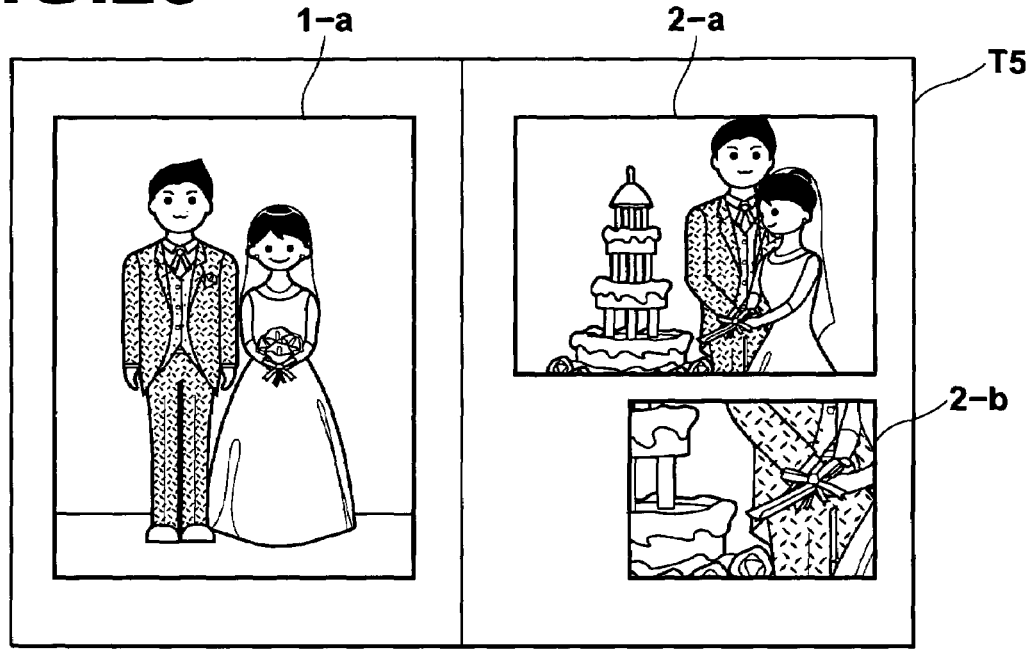
FIG. 23 shows a third case of the procedure for image selection in the fourth embodiment.

FIG. 23 shows a third case of the procedure for image selection in the fourth embodiment. In the case where an image agreeing with the condition specification information set 1-2, that is, an image not including a cross but including two people among which the person dressed in white in the right is holding red flowers while the person in the left is not dressed in white (an image of the bride and groom with red flowers held by the bride), is inserted in the image insertion area 1-*a*, the combinations available in this case are No. 5 and 6 according to the correspondence information. Therefore, "2" is displayed in the combination quantity display field 56B.

If the image insertion area 2-*a* is selected in this state, all images agreeing with the condition specification information sets 2-3 and 2-4 are sifted.

In the case where an image agreeing with the condition specification information set 2-3, that is, an image including a white cake and two people facing to the left among which the person in the right is dressed in white (an image of the bride and groom cutting a wedding cake), is inserted in the image insertion area 2-*a*, the combination available in this case is No. 5 according to the correspondence information. Therefore, "1" is displayed in the combination quantity display field 56B. If the image insertion area 2-*b* is selected in this state, images agreeing with the condition specification information set 3-5 are sifted. Therefore, an image agreeing with the condition specification information set 3-5, that is, an image including a white cake and a white area of parallelogram (a close-up of hands at the time of cutting the wedding cake), can be inserted in the image insertion area 2-*b*.

Figure 24:
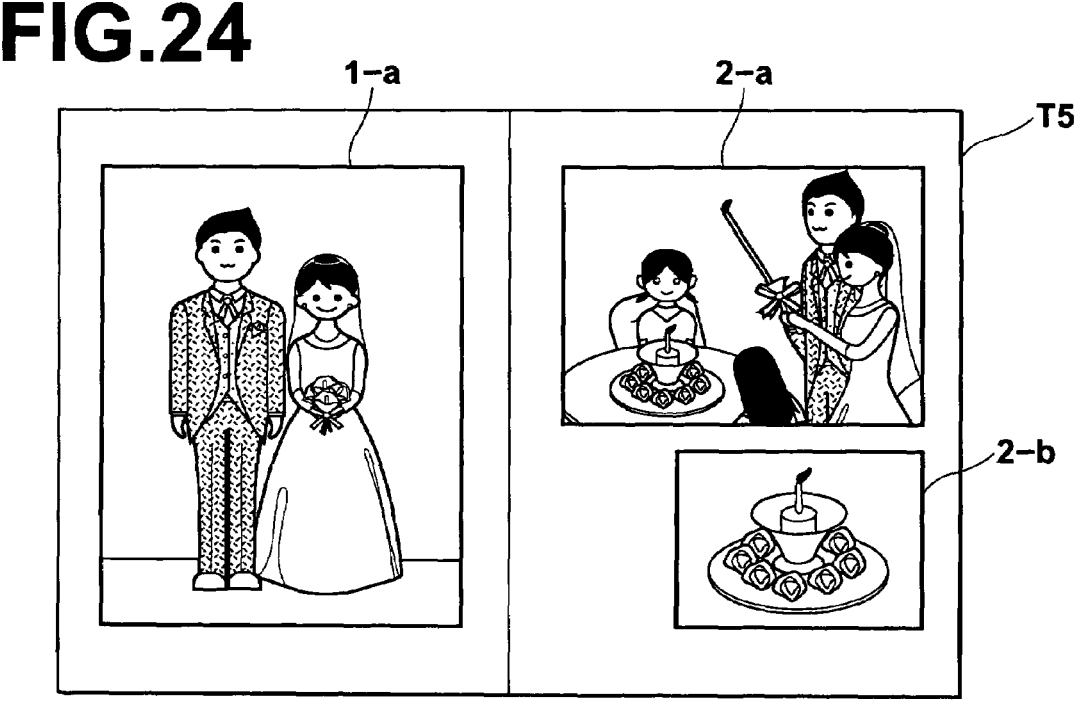
FIG. 24 shows a fourth case of the procedure for image selection in the fourth embodiment.

FIG. 24 shows a fourth case of the procedure of image selection in the fourth embodiment. The procedure after insertion of an image agreeing with the condition specification information set 1-2 in the image insertion area 1-*a* will be explained below, as in the third case described above. In the case where an image agreeing with the condition specification information set 2-4, that is, an image including a candle and two or more people among which a person on far right is dressed in white and faces to the left (an image of the bride and groom carrying out a candle lighting service), is inserted in the image insertion area 2-*a* after insertion of the image agreeing with the condition specification information set 1-2 in the image insertion area 1-*a*, the combination available in this case is No. 6 according to the correspondence information. Therefore, "1" is displayed in the combination quantity display field 56B. If the image insertion area 2-*b* is selected in this state, images agreeing with the condition specification information set 3-6 are sifted. Therefore, an image agreeing with the condition specification information set 3-6, that is, an image including a white candle and red flowers (an image of a candle on a table), can be inserted in the image insertion area 2-*b*.

If the operator clicks the Limit Combination button 56C after selecting a desired one of the combinations in the selection field 56A in the state where an image agreeing with the condition specification information set 1-1 has been inserted in the image insertion area 1-*a*, the available combinations are reduced to the selected combination. For example, if the image insertion area 2-*a* is selected after "chapel wedding 1 (ring exchange 1)" is selected in the state where an image agreeing with the condition specification information set 1-1 has been inserted in the image insertion area 1-*a*, only images agreeing with the condition specification information set 2-1 are sifted. If the image insertion area 2-*b* is further selected, images agreeing with only the condition specification information set 3-1 are sifted.

If the image insertion area 2-*a* is selected after "chapel wedding 2 (ring exchange 2)" is selected, only images agreeing with the condition specification information set 2-1 are sifted. If the image insertion area 2-*a* is selected after "chapel wedding 3 (signing oath 1)" is selected, only images agreeing with the condition specification information set 2-2 are sifted. If the image insertion area 2-*a* is selected after "chapel wedding 4 (signing oath 2)" is selected, only images agreeing with the condition specification information set 2-2 are sifted.

In the embodiments described above, the condition specification information sets are added in advance to the template. However, a new condition specification information set may be added at the time of editing the photo album.

In the embodiments described above, the processed image data sets of the selected images are printed by the mini-laboratory 3A or 3B, and the operator pastes the prints on the photo album paper corresponding to the template for generating the photo album. However, the file server 5 may generate a composite image data set representing an image (a photo album image) having the images selected by the operator and inserted in the image insertion areas in the template by combining the processed image data sets and the template data set. The composite image data set is output to the mini-laboratory 3A or 3B.

If the mini-laboratory 3A or 3B prints the composite image data set generated in this manner, the photo album can be generated by simply binding the print of the photo album image, without pasting the prints on the paper.

In the above-described embodiments, the photo album is generated by using the image data sets obtained by reading the images recorded on the developed film. However, a photo album can be generated by using image data sets obtained by a digital camera. In this case, the file server 5 comprises a media drive for reading the image data sets from a recording medium such as a memory card storing the image data sets obtained by photography. The image data sets read from the recording medium by the media drive are stored in the file server 5. A photo album can also be generated by using image data sets obtained by a camera-embedded mobile phone. In this case, the image data sets sent from the mobile phone via a mobile phone network are stored in the file server 5.

In the above-described embodiments, the file server 5 carries out the preparatory processing only on the image data sets selected by the operator using the photo album editing PC 1. However, all the image data sets may be stored in the file server 5 after the preparatory processing carried out thereon when the image data sets are received from the mini-laboratory 3A or 3B or from the scanner 3C. Furthermore, the photo album editing PC 1 may carry out the preparatory processing on all the image data sets sent from the file server 5 or on the image data sets selected for the photo album generation.

What is claimed is:

1. An image editing apparatus comprising:
display means for carrying out various kinds of display;
image display control means for displaying a catalog of images on the display means;
template display control means for displaying a template, which is represented by template data, used as photo album paper on the display means together with the catalog, the template having at least one image insertion area and added with condition specification information to a header of the template data, the condition specification information comprising conditions for determining a state of a subject in a given image that is appropriate for insertion in the at least one image insertion area, an image quality of the given image, or a state of the given image to be inserted in the at least one image insertion area;
selection reception means for receiving selection of the at least one image insertion area in the template displayed on the display means;

image sifting means for sifting appropriate images, from the catalog of images, agreeing with the condition specification information for the selected at least one image insertion area, with reference to the condition specification information for the selected at least one image insertion area; and image selection means for receiving selection of an image, among the appropriate images, to be inserted in the selected image insertion area.

2. An image editing apparatus comprising:

display means for carrying out various kinds of display;

image display control means for displaying a catalog of images on the display means;

template display control means for displaying a template, which is represented by template data, used as photo album paper on the display means together with the catalog, the template having at least one image insertion area and added with a plurality of sets of condition specification information to a header of the template data, the plurality of the sets of the condition specification information comprising conditions for determining a state of a subject in a given image that is appropriate for insertion in the at least one image insertion area, an image quality of the given image, or a state of the given image to be inserted in the at least one image insertion area;

selection reception means for receiving selection of the at least one image insertion area in the template displayed on the display means;

image sifting means for sifting appropriate images, from the catalog of images, agreeing with at least one of the plurality of sets of condition specification information for the selected at least one image insertion area, with reference to a set or sets of condition specification information among the plurality of sets of condition specification information for the selected at least one image insertion area; and image selection means for receiving selection of an image, among the appropriate images, to be inserted in the selected image insertion area.

3. An image editing apparatus comprising:

display means for carrying out various kinds of display;

image display control means for displaying a catalog of images on the display means;

template display control means for displaying a template, which is represented by template data, used as photo album paper on the display means together with the catalog, the template having image insertion areas and added with sets of condition specification information to a header of the template data, the sets of condition specification information comprising conditions for determining a state of a subject in each of images to be inserted respectively in the image insertion areas or an image quality of the each of the images, the template also added with correspondence information representing correspondence between the sets of condition specification information of the respective image insertion areas for causing the images to be inserted respectively in the image insertion areas with relevance to each other;

selection reception means for receiving selection of any one of the image insertion areas in the template displayed on the display means;

image sifting means for sifting first appropriate images, from the catalog of images, agreeing with a first set of condition specification information, among the sets of condition specification information, for a predetermined one of the image insertion areas with reference to the first set of condition specification information for the predetermined image insertion area in the case where the predetermined image insertion area has been selected, and for sifting, in the case where another one of the image insertion areas is selected after selection of an image to be inserted in the predetermined image insertion area, second appropriate images, from the catalog of images, agreeing with a second set of condition specification information, among the sets of condition specification information, for the other selected image insertion area according to the correspondence information which refers to the second set of condition specification information for the other selected image insertion area corresponding to the first set of condition specification information for the image to be inserted in the predetermined image insertion area; and image selection means for receiving selection of images, among the first appropriate images and the second appropriate images, to be inserted respectively in the image insertion areas.

4. An image editing method comprising the steps of:

displaying a catalog of images on display means;

displaying a template, which is represented by template data, used as photo album paper on the display means together with the catalog, the template having at least one image insertion area and added with condition specification information to a header of the template data, the condition specification information comprising conditions for determining a state of a subject in a given image that is appropriate for insert ion in the at least one image insertion area, an image quality of the given image, or a state of the given image to be inserted in the at least one image insertion area;

receiving selection of the at least one image insertion area in the template displayed on the display means;

sifting appropriate images, from the catalog of images, agreeing with the condition specification information for the selected at least one image insertion area, with reference to the condition specification information for the selected at least one image insertion area; and receiving selection of an image, among the appropriate images, to be inserted in the selected image insertion area.

5. An image editing method comprising the steps of:

displaying a catalog of images on display means;

displaying a template, which is represented by template data, used as photo album paper on the display means together with the catalog, the template having at least one image insertion area and added with a plurality of sets of condition specification information to a header of the template data, the plurality of the sets of the condition specification information comprising conditions for determining a state of a subject in a given image that is appropriate for insertion in the at least one image insertion area, an image quality of the given image, or a state of the given image to be inserted in the at least one image insertion area;

receiving selection of the at least one image insertion area in the template displayed on the display means;

sifting appropriate images, from the catalog of images, agreeing with at least one of the plurality of sets of condition specification information for the selected at least one image insertion area, with reference to a set or sets of condition specification information among the plurality of sets of condition specification information for the selected at least one image insertion area; and receiving selection of an image, among the appropriate images, to be inserted in the selected image insertion area.

6. An image editing method comprising the steps of:

displaying a catalog of images on display means;

displaying a template, which is represented by template data, used as photo album paper on the display means together with the catalog, the template having image insertion areas and added with sets of condition specification information to a header of the template data, the sets of condition specification information comprising conditions for determining a state of a subject in each of images to be inserted respectively in the image insertion areas or an image quality of the each of the images, the template also added with correspondence information representing correspondence between the sets of condition specification information of the respective image insertion areas for causing the images to be inserted respectively in the image insertion areas with relevance to each other;

receiving selection of any one of the image insertion areas in the template displayed on the display means;

sifting first appropriate images, from the catalog of images, agreeing with a first set of condition specification information, among the sets of condition specification information, for a predetermined one of the image insertion areas with reference to the first set of condition specification information for the predetermined image insertion area in the case where the predetermined image insertion area has been selected, and for sifting, in the case where another one of the image insertion areas is selected after selection of an image to be inserted in the predetermined image insertion area, second appropriate images, from the catalog of images, agreeing with a second set of condition specification information, among the sets of condition specification information, for the other selected image insertion area according to the correspondence information which refers to the second set of condition specification information for the other selected image insertion area corresponding to the first set of condition specification information for the image to be inserted in the predetermined image insertion area; and receiving selection of images, among the first appropriate images and the second appropriate images, to be inserted respectively in the image insertion areas.

7. A computer readable medium storing a program for causing a computer to execute an image editing method comprising the steps of:

displaying a catalog of images on display means;

displaying a template, which is represented by template data, used as photo album paper on the display means together with the catalog, the template having at least one image insertion area and added with condition specification information to a header of the template data, the condition specification information comprising conditions for determining a state of a subject in a given image that is appropriate for insertion in the at least one image insertion area, an image quality of the given image, or a state of the given image to be inserted in the at least one image insertion area;

receiving selection of the at least one image insertion area in the template displayed on the display means;

sifting appropriate images, from the catalog of images, agreeing with the condition specification information for the selected at least one image insertion area, with reference to the condition specification information for the selected at least one image insertion area; and receiving selection of an image, among the appropriate images, to be inserted in the selected image insertion area.

8. A computer readable medium storing a program for causing a computer to execute an image editing method comprising the steps of:

displaying a catalog of images on display means;

displaying a template, which is represented by template data, used as photo album paper on the display means together with the catalog, the template having at least one image insertion area and added with a plurality of sets of condition specification information to a header of the template data, the plurality of the sets of the condition specification information comprising conditions for determining a state of a subject in a given image that is appropriate for insertion in the at least one image insertion area, an image quality of the given image, or a state of the given image to be inserted in the at least one image insertion area;

receiving selection of the at least one image insertion area in the template displayed on the display means;

sifting appropriate images, from the catalog of images, agreeing with at least one of the plurality of sets of condition specification information for the selected at least one image insertion area, with reference to a set or sets of condition specification information among the plurality of sets of condition specification information for the selected at least one image insertion area; and receiving selection of an image, among the appropriate images, to be inserted in the selected image insertion area.

9. A computer readable medium storing a program for causing a computer to execute an image editing method comprising the steps of:

displaying a catalog of images on display means;

displaying a template, which is represented by template data, used as photo album paper on the display means together with the catalog, the template having image insertion areas and added with sets of condition specification information to a header of the template data, the sets of condition specification information comprising conditions for determining a state of a subject in each of images to be inserted respectively in the image insertion areas or an image quality of the each of the images, the template also added with correspondence information representing correspondence between the sets of condition specification information of the respective image insertion areas for causing the images to be inserted respectively in the image insertion areas with relevance to each other;

receiving selection of any one of the image insertion areas in the template displayed on the display means;

sifting first appropriate images, from the catalog of images, agreeing with a first set of condition specification information, among the sets of condition specification information, for a predetermined one of the image insertion areas with reference to the first set of condition specification information for the predetermined image insertion area in the case where the predetermined image insertion area has been selected, and for sifting, in the case where another one of the image insertion areas is selected after selection of an image to be inserted in the predetermined image insertion area, second appropriate images, from the catalog of images, agreeing with a second set of condition specification information, among the sets of condition specification information, for the other selected image insertion area according to the correspondence information which refers to the second set of condition specification information for the other selected image insertion area corresponding to the first set of condition specification information for the image to be inserted in the predetermined image insertion area; and receiving selection of images, among the first appropriate images and the second appropriate images, to be inserted respectively in the image insertion areas.

10. The image editing apparatus according to claim 1, wherein only one condition is specified in the condition specification information associated with the at least one image insertion area.

11. The image editing apparatus according to claim 10, wherein the only one condition is an image having a predetermined number of people.

12. The image editing apparatus according to claim 10, wherein the only one condition specifies a state of only part of an image, and if only the part of the image satisfies the only condition, the image is part of the appropriate images sifted by the image sifting means.

13. The image editing apparatus according to claim 1, wherein the condition specification information of the at least one image insertion area is independent of condition specification information of another image insertion area on the template.

14. The image editing apparatus according to claim 1, wherein the image display control means displays thumbnails of the images in the catalog together with the template.

15. The image editing apparatus according to claim 2, wherein the plurality of sets of condition specification information of the at least one image insertion area are independent of a plurality of sets of condition specification information of another image insertion area on the template.

16. The image editing apparatus according to claim 15, wherein the condition of the image or each of the images to be inserted in the at least one image insertion area specified by the plurality of sets of condition specification information comprises an image not having a predetermined number of people, a condition of only part of an image, an image of people having closed eyes, an image with a specific background, an image of a person holding a specific object, and an image satisfying a criterion regarding graininess of skin color of a person in the image.

17. The image editing apparatus according to claim 3, wherein at least one set, among the sets of condition specification information, comprises an image having a predetermined number of people, and an image of people not having red eyes.

18. The image editing apparatus according to claim 3, wherein at least one set, among the sets of condition specification information, comprises an image of a person facing a particular side, and an image of a person wearing a specific type or color of clothing.

19. The image editing apparatus according to claim 18, wherein the template comprises a left page and a right page, the left page comprising the predetermined image insertion area and the right page comprising the another image insertion area selected after selection of the image to be inserted in the predetermined image insertion area, and if the first set of condition specification information of the image to be inserted in the predetermined image insertion area comprises an image of a first person facing a right side, then the correspondence information indicates to the image sifting means to select the second appropriate images for the another image insertion area whose second set of condition specification information comprises an image of a second person facing a left side.

20. The image editing apparatus according to claim 18, wherein the template comprises the predetermined image insertion area and the another image insertion area selected after selection of the image to be inserted in the predetermined image insertion area on one page, and the second set of condition specification information of the another image insertion area comprises an image of a first person wearing a first type of clothing, and an image of the first person wearing a second type of clothing which is different from the first type of clothing, and if the first set of condition specification information of the image to be inserted in the predetermined image insertion area comprises an image of the first person wearing the first type of clothing, then the correspondence information indicates to the image sifting means to select the second appropriate images for the another image insertion area whose second set of condition specification information consists of an image of the first person wearing the first type of clothing.

* * * * *